(12) United States Patent
Luckner et al.

(10) Patent No.: US 8,880,247 B2
(45) Date of Patent: Nov. 4, 2014

(54) METHOD FOR PLANNING A LANDING APPROACH OF AN AIRCRAFT, COMPUTER PROGRAM PRODUCT WITH A LANDING APPROACH PLAN STORED THEREON, AS WELL AS DEVICE FOR PLANNING A LANDING APPROACH

(71) Applicant: Airbus Operations GmbH, Hamburg (DE)

(72) Inventors: Robert Luckner, Berlin (DE); Matthias Lauterbach, Berlin (DE); Björn Dorr, Stuhr (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/748,345

(22) Filed: Jan. 23, 2013

(65) Prior Publication Data

US 2013/0204470 A1 Aug. 8, 2013

Related U.S. Application Data

(60) Provisional application No. 61/589,467, filed on Jan. 23, 2012.

(30) Foreign Application Priority Data

Jan. 23, 2012 (DE) .......................... 10 2012 001 268

(51) Int. Cl.
*G05D 1/10* (2006.01)
(Continued)

(52) U.S. Cl.
CPC ................ *G08G 5/02* (2013.01); *G05D 1/0676* (2013.01); *G08G 5/025* (2013.01); *B64C 9/28* (2013.01); *B64C 9/20* (2013.01)

USPC ................ 701/18; 701/16; 244/181; 244/183

(58) Field of Classification Search
CPC ....... G05D 1/0676; G08G 5/02; G08G 5/025; B64C 9/20; B64C 9/28; B64C 9/30; G01S 1/02
See application file for complete search history.

(56) References Cited

U.S. PATENT DOCUMENTS

| 4,106,730 A | 8/1978 | Spitzer et al. |
| 7,611,098 B2 | 11/2009 | Van Boven |

(Continued)

FOREIGN PATENT DOCUMENTS

| DE | 102012001268 | 7/2013 |
| EP | 1498794 | 1/2005 |

(Continued)

OTHER PUBLICATIONS

Simulation of automatical landing approaches for passenger planes at the example of a Boeing 707; Von Chr. Dehn, Braunschweig; Apr. 1978 p. 251-258. Germany.

*Primary Examiner* — Michael J Zanelli
(74) *Attorney, Agent, or Firm* — Jenkins, Wilson, Taylor & Hunt, P.A.

(57) ABSTRACT

A method and computer program product for planning a landing approach of an aircraft based on an actual position or first nominal position of the aircraft during its approach for landing on a runway, including providing a stabilization flight path section and stabilization region and/or stabilization point defined by an altitude profile by at least one configuration change point in the stabilization flight path section with a change of the overall profile configuration of the airfoils and with a predetermined final approach flight status of the aircraft, and checking or changing position of the at least one configuration change measure in a change and/or the addition of an additional configuration change measure to the stabilization flight path section and by changing a speed profile along the stabilization flight path section so that the aircraft reaches the predetermined final approach flight status in the stabilization region or at the stabilization point.

14 Claims, 16 Drawing Sheets

(51) Int. Cl.
*G05D 1/04* (2006.01)
*B64C 19/00* (2006.01)
*G08G 5/02* (2006.01)
*G05D 1/06* (2006.01)
*B64C 9/28* (2006.01)
*B64C 9/20* (2006.01)

(56) References Cited

U.S. PATENT DOCUMENTS

| | | |
|---|---|---|
| 8,027,758 B2 * | 9/2011 | Ferro et al. ............... 701/18 |
| 2006/0049308 A1 | 3/2006 | Good et al. |
| 2007/0057114 A1 | 3/2007 | Boissenin et al. |
| 2007/0185628 A1 * | 8/2007 | Delaplace et al. ............ 701/4 |
| 2009/0152403 A1 * | 6/2009 | Delaplace et al. ............ 244/183 |
| 2010/0200704 A1 * | 8/2010 | Berens et al. ............ 244/76 A |
| 2011/0062282 A1 * | 3/2011 | Richter et al. ............ 244/99.4 |
| 2012/0150369 A1 * | 6/2012 | Giovannini et al. ............ 701/18 |

FOREIGN PATENT DOCUMENTS

| | | |
|---|---|---|
| FR | 2817535 | 6/2002 |
| WO | WO 2009/040102 | 4/2009 |
| WO | WO2011/095360 A1 * | 8/2011 |

* cited by examiner

METHOD FOR PLANNING A LANDING APPROACH OF AN AIRCRAFT, COMPUTER PROGRAM PRODUCT WITH A LANDING APPROACH PLAN STORED THEREON, AS WELL AS DEVICE FOR PLANNING A LANDING APPROACH

CROSS-REFERENCE TO RELATED APPLICATIONS

This application claims the benefit of the filing date of German Patent Application No. 10 2012 001 268.3 filed Jan. 23, 2012 and of U.S. Patent Provisional Application No. U.S. 61/589,467 filed on Jan. 23, 2012, the disclosures of which applications are hereby incorporated herein by reference.

TECHNICAL FIELD

The invention pertains to a method for planning a landing approach of an aircraft, as well as a computer program product that causes the method to be carried out on a program-controlled device, a medium with a landing approach plan stored thereon and a device for planning a landing approach of an aircraft.

BACKGROUND

WO 2009/040102 A1 discloses a system for adjusting lifting bodies of a high-lift system of an aircraft and a flap control unit provided for regulating actuating drives that serve for adjusting the lifting bodies. The flap control unit is realized in such a way that commands for adjusting the lifting bodies and for carrying out changes in the configuration of the main wing and the lifting bodies are automatically generated in dependence on the airspeed.

SUMMARY

It is the objective of the invention to make available a method and a device for planning a landing approach of an aircraft, by means of which an economically optimal approach of the aircraft can be achieved. The invention aims, in particular, to enhance existing methods and devices for planning a landing approach of an aircraft and to make available a technical solution, by means of which an adaptation of a planned landing approach, as well as an optimization of a planned landing approach in accordance with a predetermined optimization goal and predetermined marginal conditions, can be achieved with simple means.

This objective is attained with the characteristics of the independent claims. Other embodiments are disclosed in the dependent claims that refer to these independent claims.

The invention proposes, in particular, a method for preparing a landing approach plan for an aircraft, in which: at least one configuration change condition and a configuration change measure assigned thereto are defined on a provided stabilization flight path section of the aircraft, wherein the configuration change measure is a measure, by means of which an overall aerodynamic profile configuration is changed. It is furthermore proposed, in particular, that the nominal flight path extends between a nominal starting position and a stabilization region and/or the stabilization point, at which the aircraft needs to have a final approach flight status, wherein at least one configuration change condition is carried out while flying along the stabilization flight path section of the aircraft, and wherein a drag-lift ratio of the airfoils is adjusted due to a changed adjustment of the overall aerodynamic profile configuration of airfoils of the aircraft.

According to an embodiment of the inventive method, it would be possible, in particular, to incorporate the additional step of: changing, deleting or additionally defining at least one element of the group comprising configuration change condition and configuration change measure if the final approach flight status is not fulfilled in the stabilization region and/or at the stabilization point.

The invention furthermore proposes, in particular, a method for planning a landing approach of an aircraft based on an actual position or first nominal position of the aircraft during its approach for landing on a runway, wherein the method features the following steps:

providing a stabilization region and/or a stabilization point with respect to the landing of the aircraft, a final approach flight status of the aircraft required for the stabilization region and/or the stabilization point and a stabilization flight path section that is at least defined in the form of an altitude profile and extends between an actual position or a first nominal position of the aircraft and the stabilization region and/or the stabilization point, providing or specifying at least one configuration change condition that can be fulfilled while the aircraft flies along the stabilization flight path section as planned and one respective configuration change measure that is assigned to the at least one configuration change condition and causes a drag-lift ratio of the airfoils to be adjusted due to a changed adjustment of the overall aerodynamic profile configuration of airfoils of the aircraft.

The invention proposes, in particular, to assign to the flight plan of the aircraft the combination of the predetermined stabilization flight path section and the configuration change condition with the least one configuration change measure that is respectively assigned to this configuration change condition and carried out on the aircraft when the respective configuration change condition is fulfilled while flying along the stabilization flight path section as planned.

According to an embodiment of the inventive method, it is proposed to assign the combination of the predetermined stabilization flight path section and the configuration change condition with the at least one configuration change measure that is respectively assigned to this configuration change condition to the flight plan of the aircraft by carrying out the following steps:

determining an expected final approach flight status of the aircraft that the aircraft assumes when the predetermined stabilization region or stabilization point is reached while the aircraft flies along the stabilization flight path section, if the determined final approach flight status of the aircraft only deviates from the required final approach flight status of the aircraft within a predefined limit, assigning to the flight plan of the aircraft the combination of the predetermined stabilization flight path section and the configuration change condition with the least one configuration change measure that is respectively assigned to this configuration change condition and carried out on the aircraft when the respective configuration change condition is fulfilled while the aircraft flies along the stabilization flight path section as planned, if the determined final approach flight status of the aircraft deviates from the required final approach flight status of the aircraft by more than a predefined limit, changing the speed profile for a flight along the stabilization flight path section by changing the at least one configuration change condition and/or the at least one configuration change measure for the fulfillment of the respective configuration change condition that is/are assigned to the provided stabilization flight path section and/or by adding at least one additional configuration change condition with a configuration change measure for the fulfillment thereof in such a way that the aircraft reaches the required final approach flight status of the aircraft within the predefined limit in the stabilization region or at the stabilization point, as well as assigning to the flight plan the combination of the thusly determined stabilization flight path section and the at least one determined configuration change condition with the least one configuration change measure that is respectively assigned to this configuration change condition.

According to an embodiment of the inventive method, it is proposed that the configuration change condition for a flight of the aircraft along the stabilization flight path section is defined by:

reaching a configuration change point along the respectively provided stabilization flight path section and/or reaching at least one configuration change flight status while flying along the stabilization flight path section as planned and/or reaching at least one configuration change time while flying along the stabilization flight path section as planned.

According to an embodiment of the inventive method, it is proposed that the final approach flight status is defined by a speed of the aircraft.

According to an embodiment of the inventive method, it is proposed that the final approach flight status is additionally defined by at least the presence of at least one of the following data:

an adjusting state of the airfoils and, in particular, an adjusting state of at least one aerodynamic high-lift aid on a main wing of the airfoils, in which the at least one aerodynamic high-lift aid is in a predefined landing position, a state of the landing gear, in which this landing gear is lowered, a state, in which certain deviations from predefined variables are not exceeded, particularly the deviation of the aircraft from a landing course and a gliding path, the adjustment of a certain engine speed that is higher than in the idling state of the engine.

According to an embodiment of the inventive method, it is proposed that the change of the at least one configuration change condition and/or the adjustment of an overall aerodynamic profile configuration of the airfoils of the aircraft for carrying out a predetermined configuration change measure and/or the addition of at least one additional configuration change measure with an adjustment of an overall aerodynamic profile configuration of the airfoils in the stabilization flight path section is carried out based on one or more optimization goals:

the aircraft requires the shortest possible flight time during its flight with optimized execution of the landing approach between the first nominal position and the stabilization region and/or the stabilization point, the aircraft observes a suitable predetermined flight duration within a predefined limits during its flight with optimized execution of the landing approach between the first nominal position and the stabilization region and/or the stabilization point, the engines of the aircraft generate altogether generate the lowest possible thrust or a lowest possible maximally occurring thrust during its flight with optimized execution of the landing approach between the first nominal position and the stabilization region and/or the stabilization point, the aircraft consumes the smallest possible quantity of fuel during its flight with optimized execution of the landing approach between the first nominal position and the stabilization region and/or the stabilization point.

According to an embodiment of the inventive method, it is proposed that the determination of a configuration change measure for a configuration change condition and/or a change of the at least one configuration change condition for carrying out a configuration change measure is/are realized by carrying out the following steps:

changing and/or defining at least one configuration change condition for carrying out a predetermined configuration change measure in a deceleration predictor based on the flight plan data and determining by means of said deceleration predictor an region of the respectively determined stabilization flight path section that results from the change and/or definition of the at least one configuration change condition and in which the required final approach flight status of the aircraft is reached, repeating the change and/or definition of at least one configuration change condition for carrying out a predetermined configuration change measure in the deceleration predictor based on an optimization goal until the required final approach flight status of the aircraft is reached in the stabilization region or within predefined limits at the stabilization point.

According to an embodiment of the inventive method, it is proposed that at least one maximum airspeed of the aircraft is provided, of which one maximum airspeed of the aircraft is respectively assigned to each of the at least one configuration change conditions as boundary condition to be fulfilled for allowing a configuration change measure to be carried out when the respective configuration change condition is fulfilled within the stabilization flight path section and/or an addition of an additional configuration change condition, and that the at least one configuration change measure is upon fulfillment of a configuration change condition while flying along the stabilization flight path section as planned only carried out if the speed of the aircraft, which is assumed to be the speed of the aircraft during a change to be respectively monitored or an intended change of the configuration change measure and/or a change of the configuration change condition and/or an addition of at least one additional configuration change measure, lies below a maximum airspeed and, in particular, below a maximum speed specified for a configuration of the airfoils.

According to an embodiment of the inventive method, it is proposed that the configuration change measure is upon fulfillment of a configuration change condition and/or a change of the at least one configuration change condition for carrying out the configuration change measure and/or an addition of at least one additional configuration change measure is carried out in such a way that the speed of the aircraft (F) does not drop below a minimum speed specified for a configuration of the airfoils as boundary condition for carrying out the respectively next configuration change measure.

According to an embodiment of the inventive method, it is proposed that the configuration change measure is defined by: at least one respective predetermined change of the configuration of the airfoils, in particular, for changing the deformation state of the main wing of the aircraft and/or an adjusting state of at least one leading edge high-lift aid and, in particular, the adjusting angle thereof relative to the main wing and/or an adjusting state of at least one trailing edge high-lift aid and, in particular, the adjusting angle thereof relative to the main wing and/or a deformation state of at least one leading edge high-lift aid and/or trailing edge high-lift aid.

According to an embodiment of the inventive method, it is proposed that the configuration change point of a configuration change measure is defined by a point along and/or a time specification within the flight path and/or by reaching a defined flight status of the aircraft.

According to an embodiment of the inventive method, it is proposed that the specification of a stabilization region and/or a stabilization point takes place due to a pilot input or is realized by an aircraft system.

According to an embodiment of the inventive method, it is proposed
  that a nominal flight path until reaching a residual flight altitude is determined prior to the landing of the aircraft based on the stabilization flight path section and used as specification for determining the nominal flight path (a final approach nominal flight path section that is predefined with respect to its altitude profile), and that the stabilization flight path section transforms into the final approach nominal flight path section,
  that the final approach nominal flight path section extends between the stabilization region and/or the stabilization point S and a landing reference point, particularly in the form of a planned touchdown point on the runway, that is related to position data of the runway and lies between the stabilization region and/or the stabilization point S and the runway, and
  that particularly the stabilization flight path section and the predetermined final approach nominal flight path section are respectively defined by a location-dependent or time-dependent altitude profile, wherein the aircraft descends to a residual flight altitude with constant flight path angle and/or with constant speed along the final approach nominal flight path section.

According to an embodiment of the inventive method, it is proposed that the stabilization point or safety stabilization point in the stabilization region is specified in such a way that it lies at the beginning of the predetermined final approach nominal flight path section that is defined, in particular, by an altitude profile and a speed profile.

According to an embodiment of the inventive method, it is proposed that the method features the following steps:
  determining a stabilization flight path section by defining a flight path section backward from the stabilization point or stabilization region in the direction of the current actual position of the aircraft during at least one predetermined configuration change measure along the flight path section such that a starting point of the stabilization flight path section and a course of the stabilization flight path section that is at least defined by a positionally fixed starting point and an altitude profile result,
  carrying out a subsequent flight along the determined stabilization flight path section with automatic flight path control or the display of control commands for carrying out a subsequent manual flight along the flight path to the pilot on a flight instrument, particularly on a Flight Director, wherein the at least one measure for changing the configuration of the airfoils is carried out automatically or by the pilot when the aircraft passes the configuration change point and/or when the configuration change flight status is reached and/or when the configuration change time is reached.

According to an embodiment of the inventive method, it is proposed that a nominal and/or actual flight status of the aircraft is used as starting point of the stabilization flight path section in the determination of the stabilization flight path, and that the determination of the stabilization flight path section is carried out by varying at least one configuration change measure and/or control specifications such as, in particular, an airspeed that is variable over the stabilization flight path section or the thrust that is variable over the stabilization flight path section for a predetermined flight path course in the horizontal plane.

According to the invention, it would generally be possible that the landing reference point is with respect to the runway a planned touchdown point of the aircraft on the runway.

According to the invention, it would generally also be possible that a stabilization time is defined in addition to the specification of a stabilization point.

According to an embodiment of the inventive method, it is proposed that the gradient of the speed profile of the stabilization flight path section is changed at times, at which the at least one configuration change measure is carried out.

According to an embodiment of the inventive method, it is proposed that the at least one configuration change measure is defined in dependence on a predetermined configuration change flight status.

According to an embodiment of the inventive method, it is proposed that the at least one configuration change flight status is an airspeed and that the configuration change measure comprises the change of an adjusting state of at least one aerodynamic leading edge high-lift aid and/or at least one aerodynamic trailing edge high-lift aid.

According to another aspect of the invention, a device for planning a landing approach of an aircraft with a function for the flight path control of the aircraft based on an actual position or first nominal position of the aircraft during the approach for landing on a runway is proposed, wherein said function features:
  an interface for receiving a stabilization flight path section between an actual position or a first nominal position of the aircraft and a stabilization region and/or a stabilization point that is defined in the form of an altitude profile with at least one configuration change point for the configuration change measure in the stabilization flight path section, with a change of the overall profile configuration of the airfoils at this configuration change point and with a predetermined final approach flight status of the aircraft for this stabilization region or stabilization point,
  a function module for checking or changing the position, at which the at least one configuration change measure is carried out in the stabilization flight path section with a change within the stabilization flight path section and/or the addition of an additional configuration change measure and thusly changing a speed profile along the stabilization flight path section in such a way that the aircraft reaches the predetermined final approach flight status of the aircraft at least within predefined limits in the stabilization region or at the stabilization point.

According to an embodiment of the inventive device, it is proposed that the control and monitoring unit features a function module for checking input data and specification data such as the deceleration flight path section specified in the form of an altitude profile, as well as other data on the position and the flight status of the aircraft, wherein said function module checks the input data and specification data with respect to availability and/or correctness and decides that the optimized landing approach cannot be carried out if the availability and/or the correctness criterion is/are not fulfilled.

According to another aspect of the invention, a computer program product is proposed that causes an embodiment of the inventive method to be carried out on a program-controlled device.

According to another aspect of the invention, a medium is proposed, on which a landing approach plan prepared in accordance with an embodiment of the inventive method is stored.

BRIEF DESCRIPTION OF THE DRAWINGS

Exemplary embodiments of the invention are described below with reference to the attached figures, in which.

DETAILED DESCRIPTION

Figure 1:
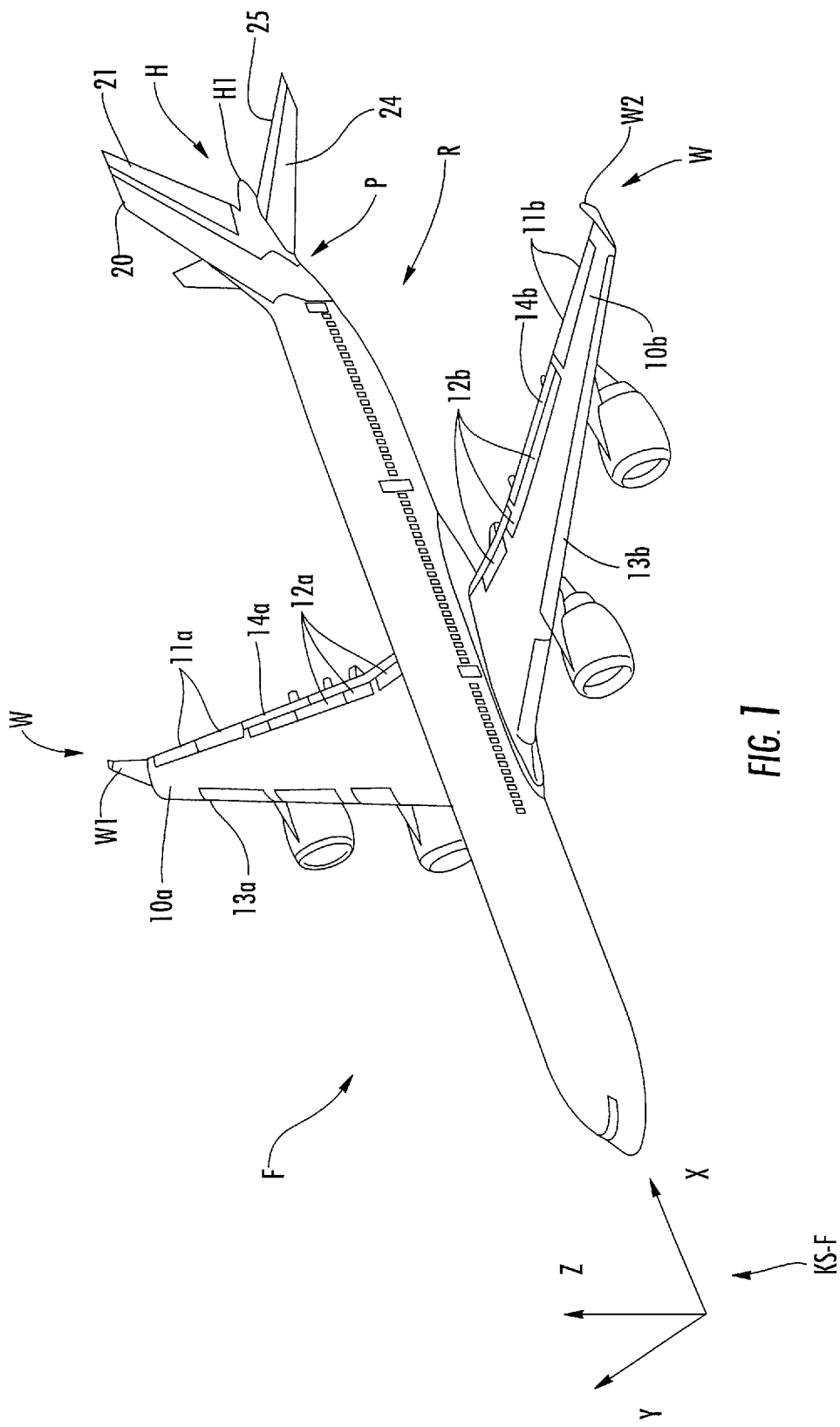
FIG. 1 shows an illustration of an aircraft with leading edge lifting bodies and trailing edge lifting bodies that form part of a high-lift system.

FIG. 1 shows an exemplary embodiment of a controlled aircraft F with two airfoils 10a, 10b. The airfoils 10a, 10b respectively feature, in particular: at least one control flap A that can be adjusted in two directions from a neutral position and is realized in the form of a respective aileron 11a and 11b and a plurality of respective spoilers 12a and 12b. Furthermore, aerodynamic leading edge lifting aids or leading edge lifting bodies 13a and 13b, e.g., in the form of slats, aerodynamic trailing edge lifting aids or trailing edge lifting bodies 14a, 14b, e.g., in the form of trailing edge flaps, a rudder unit 20 with a rudder 21 and an elevator unit 24 with at least one respective elevator 25 are provided on the aircraft shown. A coordinate system referred to the aircraft F with a longitudinal aircraft axis X, a lateral aircraft axis Y and a vertical aircraft axis Z is also illustrated in FIG. 1.

The inventive aircraft F may also have a different shape than the aircraft F illustrated in FIG. 1. For example, the inventive aircraft may also comprise a high-wing monoplane or a flying wing. The aircraft may also comprise an aircraft that features canards instead of an elevator unit.

Figure 2:
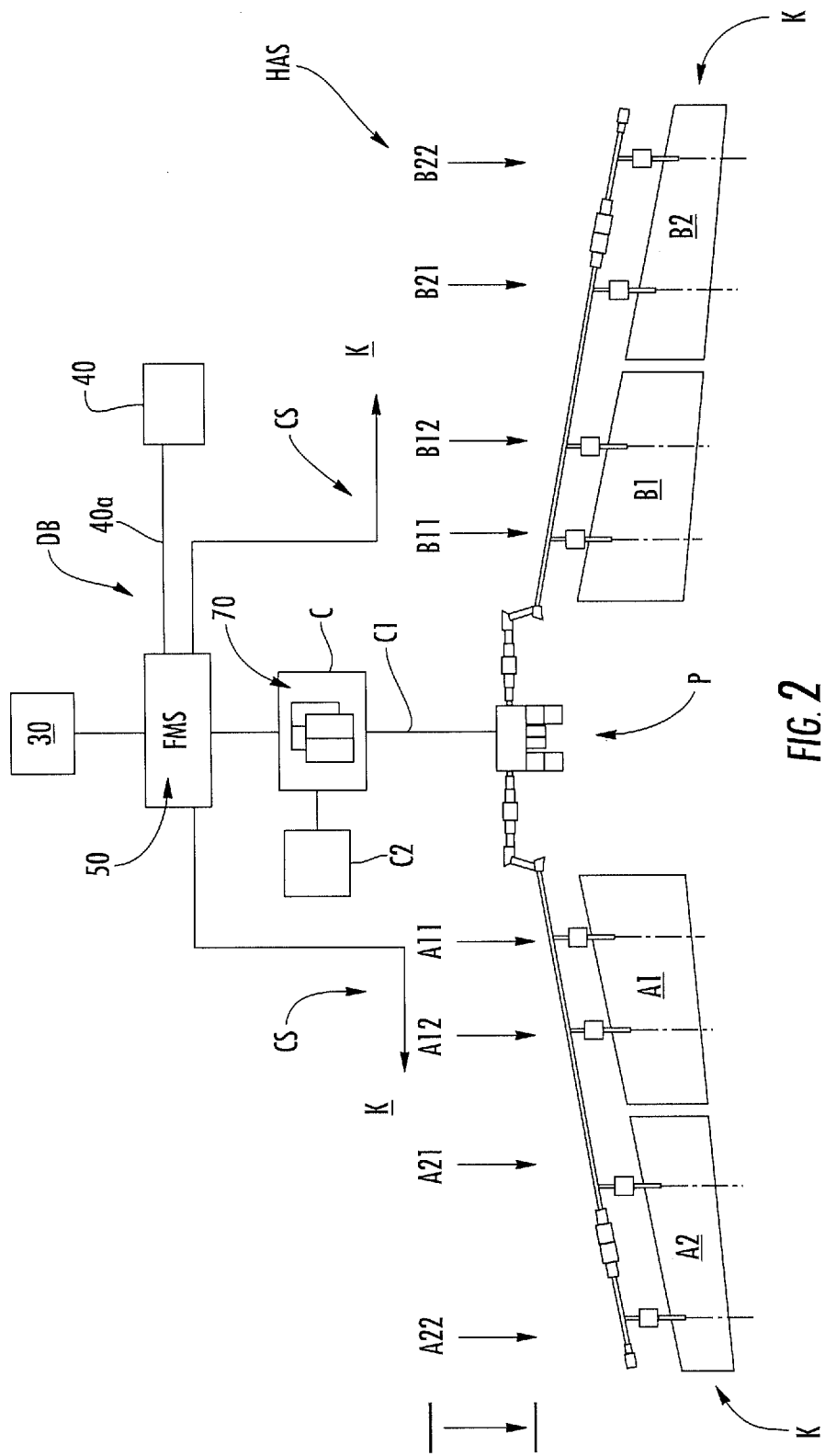
FIG. 2 shows a functional illustration of an embodiment of a high-lift system according to the invention.

The high-lift system of the aircraft according to FIG. 1 features aerodynamic leading edge lifting aids 13a, 13b, aerodynamic trailing edge lifting aids 14a, 14b and generally lifting bodies that are also identified by the reference symbol K in FIG. 2. These lifting bodies are supported on the respective main wing by means of a guide mechanism and can be adjusted, particularly retracted and extended, relative to the main wing. However, this embodiment should only be interpreted in an exemplary fashion. The term high-lift aids refers to leading edge flaps and/or trailing edge flaps and/or mechanisms for twisting and/or deforming the wings and/or active and/or passive methods for influencing the flow on the airfoil of an aircraft, the adjustment of which leads to a change of the maximum coefficient of lift and/or the drag-lift ratio of the aircraft. The leading edge lifting aids 13a, 13b and the trailing edge lifting aids 14a, 14b therefore do not have to comprise separate bodies such as, e.g., flaps or slats, but may also be realized differently, particularly in the form of flexible wing areas with continuously variable curvature on the leading edge or the trailing edge of the main wing or another suitable fashion such as, e.g., in the form of passive or active flow control measures. The high-lift system of the aircraft according to the invention may also feature at least one trailing edge lifting aid and no leading edge lifting aids.

This is expressed below with the term "aerodynamic lifting aids" or "high-lift bodies" or "lifting bodies." The invention is not limited to high-lift systems, in which at least one leading edge lifting aid 13a, 13b and at least one trailing edge lifting aid 14a, 14b are combined on the same airfoil.

The aircraft F features an aircraft system with a flight management system FMS and with a man-machine interface. This interface may feature, in particular: a pilot display and a flight management system and/or control input device or specification device 30, particularly for inputting control specifications or nominal specifications 30a for the flight path control of the aircraft (not illustrated in the figures), that is arranged in the cockpit of the aircraft and may feature, in particular, the pilot input means such as a joystick and optionally also pedals.

The aircraft system furthermore features a flight control module 50 (FIG. 3) that may, in particular, form a functional component of the flight management system FMS. Alternatively, the flight control module 50 may also be realized in the form of a module that is functionally independent of the flight management system FMS or integrated into another (not-shown) aircraft system. The flight control module 50 is designed, in particular, for the management and for the flight path control of the aircraft F and functionally connected to the control input device 30.

An aircraft realized in accordance with the invention furthermore features at least one control and monitoring unit C for controlling or regulating and for monitoring a high-lift system HAS of the aircraft F, particularly the aerodynamic configuration of the airfoils that is managed with the high-lift system HAS. The control and monitoring unit C may be realized in different ways.

Figure 3:
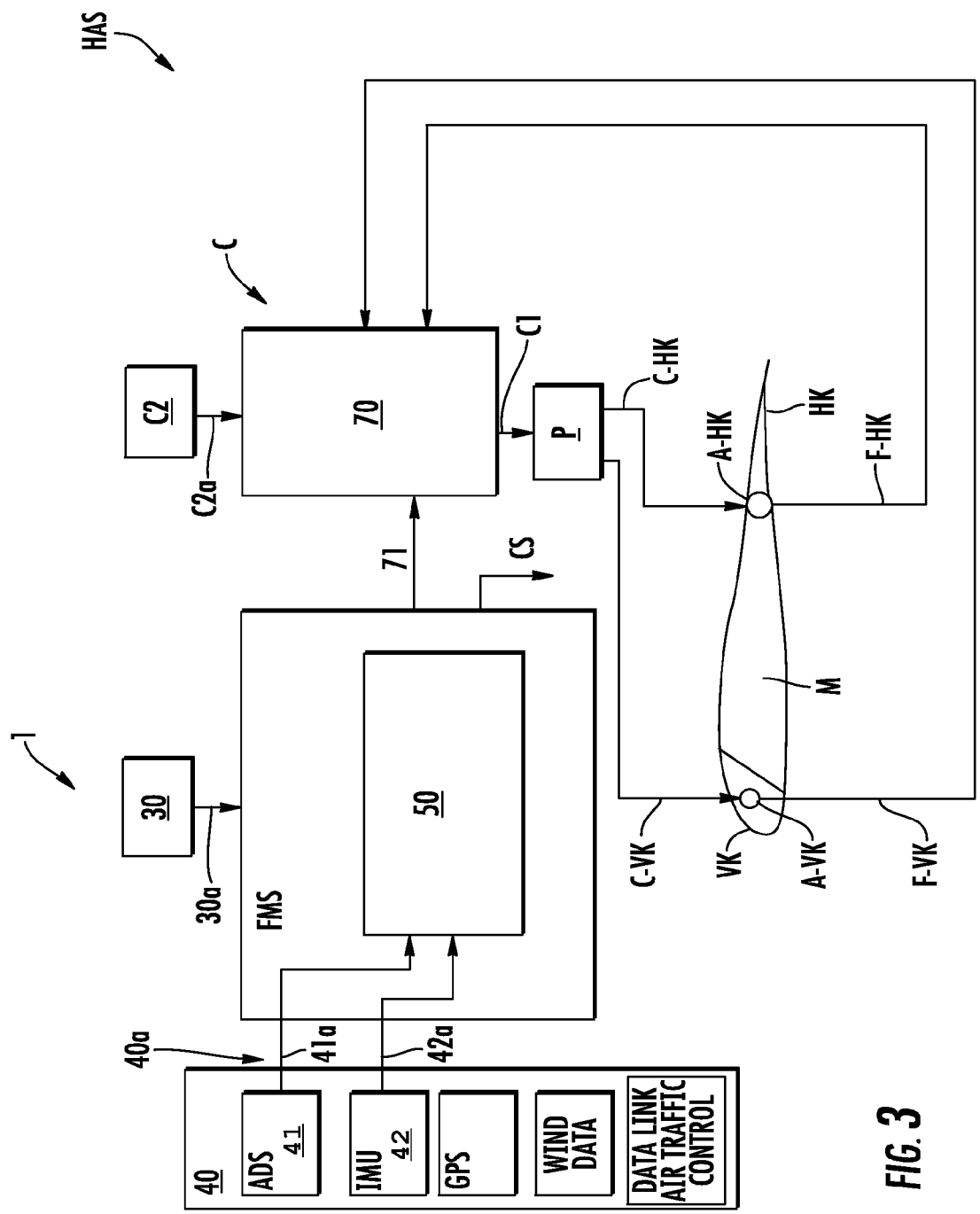
FIG. 3 shows a functional illustration of the regulation of leading edge lifting bodies and trailing edge lifting bodies in functional connection with a flight control unit.

It may be realized in the form of a central computer system with a central control and monitoring function of the high-lift system HAS as illustrated in FIG. 2 and identified by the reference symbol "C." The central computer system may be realized by means of corresponding hardware and software, particularly in the form of a fail-safe system that can be reconfigured for predetermined fault scenarios. A control and monitoring function of the high-lift system HAS identified by the reference symbol "70" in FIG. 3 is respectively implemented, in particular, in the control and monitoring unit C or the computer system with the control and monitoring unit C. In the system according to FIG. 2, the control and monitoring function 70 for the entire high-lift system HAS is implemented in a single or central control and monitoring unit C of a computer system that is centrally arranged in the aircraft. The high-lift system may alternatively be composed of a control and monitoring unit C that is centrally arranged in the aircraft F, as well as several other local control and monitoring units.

FIGS. 2 and 3 show embodiments of the flight management system FMS, in which the flight control module 50 is integrated into the flight management system FMS. With respect to the functionality of the flight control module 50, the flight management system FMS may feature, in particular, mission planning functions and especially a mission planning module with mission planning functions, by means of which, e.g., nominal flight paths for the aircraft F are determined or at least provided. In an alternative embodiment of the aircraft F, the flight control module 50 is arranged on the same functional level as functions of the flight management system FMS that do not form part of the flight control module 50, but part of the flight management system FMS in the embodiment according to FIGS. 2 and 3.

The aircraft F furthermore features a flight status sensor unit 40 that may be realized, in particular, with an air data sensor unit 41 (Air Data System, ADS), as well as a flight attitude sensor unit or an inertial sensor unit 42 (Inertial Measurement Unit, IMU), for acquiring flight status data of the aircraft F. The air data sensor unit 41 features air data sensors for determining the flight status of the aircraft F and, in particular, the dynamic pressure, the static pressure and the temperature of the air flowing around the aircraft F. The flight attitude sensor unit 42 serves for determining, in particular, turning rates of the aircraft F including the pitch rates, the yaw rates and the rolling rates of the aircraft in order to determine the flight attitude thereof, as well as accelerations of the aircraft F including the horizontal, lateral and vertical accelerations in order to determine the respective speed components and the position of the aircraft F.

The flight control module 50 receives the flight status sensor signals 40a of the sensor values acquired by the flight status sensor unit 40, particularly the air data sensor signals 41a of the air data sensor unit 41 and the flight attitude sensor data 42a of the flight attitude sensor unit or inertial sensor unit 42. For this purpose, the flight control module 50 features a receiver for receiving the sensor values that are acquired by the sensor units 40, 41, 42 and transmitted to the flight management system FMS or the flight control unit. Other data received via suitable interfaces may comprise, e.g., satellite navigation data, measured and/or signaled wind data, data of a data link with air traffic control and/or another ground station, as well as flight planning data including the altitude of the runway to be approached.

The control function of the flight control module 50 of the flight management system FMS may be realized, in particular, in such a way that it receives control commands from the control input device 30 and sensor values 40a from the sensor unit 40, particularly turning rates acquired by this sensor unit. The control function is realized in such a way that it generates actuating commands for the actuating drives in dependence on the control commands and the acquired and received turning rates and transmits these actuating commands to the actuating drives such that the aircraft F is controlled in accordance with the control commands due to the activation of the actuating drives. The actuating drives or actuating drive units or the drives of the spoilers 12a, 12b and/or other control flaps (e.g., the ailerons 11a, 11b) may be realized in the form of hydraulic or electric drives that receive their input power from a corresponding supply system and are activated due to the actuating commands or actuating signals generated by the control unit in order to move the spoilers 12a, 12b and/or flaps.

Such planning is carried out in the inventive method or by means of the inventive device in order to plan a landing approach of an aircraft F based on an actual position or first nominal position P1 of the aircraft F during its approach for landing on a runway L (FIGS. 10, 11, 14, 15, 16). The method is based on the fact that the following specifications for the landing approach are available, i.e., provided by an aircraft system, particularly by mission planning functions:
  a stabilization region 610 and/or a stabilization point S, S' referred to the landing of the aircraft F,
  a final approach flight status of the aircraft F required for the stabilization region 610 and/or the stabilization point S, S',
  a stabilization flight path section FB-1 that is defined at least in the form of an altitude profile and extends between an actual position or first nominal position P1 of the aircraft F and the stabilization region 610 and/or the stabilization point S, S',
  at least one configuration change measure and at least one configuration change condition that can be fulfilled while flying along the stabilization flight path section FB-1 with the aircraft F as planned, wherein each configuration change condition is assigned a configuration change measure that causes an adjustment of the drag-lift ratio of the airfoils due to a changed adjustment of the overall aerodynamic profile configuration of the airfoils of the aircraft F.

The aircraft system may be realized in such a way that it determines specifications, e.g., by means of mission functions based on, in particular, mission specifications and/or based on current navigation data, as well as specifications for the landing of the respective flight, and makes these specifications available to the high-lift system HAS.

In the inventive method or in the inventive device for planning a landing approach of an aircraft F, the stabilization flight path section FB-1 may be defined, e.g., in the form of a data set with altitude information on the flight path referred to the ground. In this case, it would be possible, in particular, that the stabilization flight path section FB-1 is provided by an aircraft system such as a flight management system (FMS) or an autopilot system.

An airfoil configuration or configuration is an adjusting state of the high-lift aids relative to the airfoil that is defined by a deformation state of the high-lift aid and/or an angle between the high-lift aid and the airfoil and/or a clearance between the high-lift aid and the airfoil and/or the adjusting state of the passive and/or active measure for influencing the flow.

Figure 4:
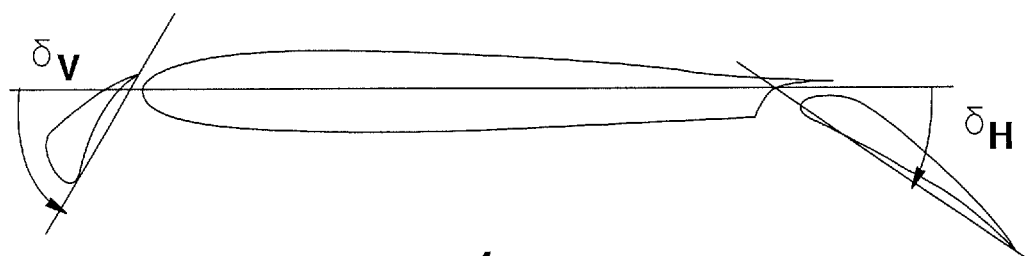
FIG. 4 shows an illustration of leading edge lifting bodies and trailing edge lifting on a wing profile and an indication of the deflection angles.

According to the invention, the airfoils generally form at least two configurations, in which the at least one leading edge lifting body 13a, 13b has different adjusting states or adjusting positions and, in particular, different adjusting angles or deflection angles δV relative to the main wing and/or in which the at least one trailing edge lifting aid 14a, 14b has different adjusting states or adjusting positions and, in particular, different adjusting angles or deflection angles δH relative to the main wing. The angles δV and δH are illustrated in FIG. 4.

A change of the configuration, i.e., of the aerodynamic configuration of the airfoils, is a change of the overall cross-sectional profile of the airfoils, by means of which a change of the drag-lift ratio is achieved. The airfoils may be respectively composed of a main wing and at least one aerodynamic high-lift aid that is arranged on the main wing such that it can be adjusted relative thereto, e.g. a flap, particularly a high-lift flap, such that a configuration change for changing the drag-lift ratio is in this case realized by changing the adjusting state of the at least one aerodynamic high-lift aid relative to the airfoil. In this embodiment of the airfoil, a configuration change measure is respectively defined, in particular, by: at least one predetermined change of the configuration of the airfoils, particularly for changing a deformation state of the main wing of the aircraft, and/or of an adjusting state of at least one leading edge high-lift aid 13a, 13b, particularly the deflection angle δV thereof relative to the main wing, and/or of an adjusting state of the at least one trailing edge high-lift aid 14a, 14b, particularly the deflection 6H angle thereof relative to the main wing, and/or of a deformation state of at least one leading edge high-lift aid 13a, 13b and/or trailing edge high-lift aid 14a, 14b.

The respective airfoils may alternatively or additionally comprise a main wing with variable shape such that a configuration change for changing the drag-lift ratio of the airfoil is in this case realized by changing the shape of the profile cross section of the respective main wing. In this embodiment of the airfoil or the aircraft, it would therefore be possible that the airfoils do not feature any aerodynamic high-lift aids in the proper sense. A main wing with variable shape may additionally feature aerodynamic high-lift aids such as flaps, particularly high-lift flaps, that may be arranged such that they can be adjusted relative to the main wing and/or may themselves have a profile with variable shape in order to additionally change the drag-lift ratio.

A configuration change measure proposed in accordance with the invention is a measure for changing the configuration of the main wings of the aircraft and/or of high-lift aids that are optionally provided on the respective main wings. According to the invention, a configuration change measure generally is a measure for changing the configuration of the airfoil, particularly one or more of the following options:

a change of the profile shape of the respective main wing, particularly if this main wing is realized in the form of a wing with variable shape, a change of the adjusting state of the at least one leading edge lifting body 13a, 13b on the respective main wing, particularly a change of the adjusting angle δV thereof relative to the main wing, and/or of the adjusting state of the at least one trailing edge lifting body 14a, 14b, particularly a change of the adjusting angle δH thereof relative to the main wing, a change of the profile shape of the at least one leading edge lifting aid 13a, 13b and/or a change of the profile shape of the at least one trailing edge lifting aid 14a, 14b.

The configuration change measure proposed in accordance with the invention therefore is a measure provided or to be carried out on the aircraft which leads to a change of the drag-lift ratio due to a change of the configuration of the airfoils. Such a measure is, in particular, a measure of an aircraft system that includes the generation of actuating commands for controlling an actuating drive or actuating drive system that is respectively arranged on an airfoil or main wing and, depending on the embodiment of the airfoil, serves for changing the aerodynamic configuration thereof.

According to the invention, the configuration change condition for a planned or actual flight of the aircraft F along the stabilization flight path section FB-1 may be defined, in particular, by:

reaching a configuration change point PK along the respectively provided stabilization flight path section FB-1 and/or reaching at least one configuration change flight status during a planned flight along the stabilization flight path section FB-1 and/or reaching at least one configuration change time during a planned flight along the stabilization flight path section FB-1.

The following terms are hereby defined for the description of the invention:

The point in space (e.g., described by three coordinates: altitude above a reference surface, geographic width and geographic length), at which the configuration change measure is carried out, is a configuration change point PK.

The invention pertains to a landing approach of an aircraft along a predefined flight path from a point P1 to a point TD that may be, for example, a touchdown point of the aircraft on the runway. The landing approach is characterized in that the aircraft needs to assume an initial approach flight status at the beginning of the landing approach and a defined final approach flight status at its end, wherein the final approach flight status is at least characterized by a lower indicated airspeed than the initial approach flight status. During the transition of the aircraft from its initial approach flight status to the final approach flight status, configuration change measures are carried out that make it possible to assume the lower indicated airspeed by increasing the maximum coefficient of lift and, due to the increase of the drag-lift ratio, usually lead to an increase of the drag while the lift remains the same. A purposeful change of the configuration change points therefore makes it possible to change the deceleration behavior of the aircraft that depends on the respective drag and this in turn makes it possible to influence the point along the flight path, at which the aircraft will reach the final approach flight status. The process, in which the final approach flight status is assumed, is referred to as stabilization; an aircraft in the final approach flight status therefore is stabilized in the landing approach.

The inventive method for realizing a landing approach in an optimized fashion describes a process, in which it is controlled when the final approach flight status is reached by purposefully changing the configuration change points PK, namely in such a way that the final approach flight status is respectively reached at a previously specified point along the flight path or the stabilization point S or within a previously specified section along the flight path or the stabilization region 610. This method makes it possible to pursue different optimization goals by adapting the deceleration behavior of the aircraft and therefore the speed profile flown along the flight path. The invention furthermore comprises a control and monitoring unit that is able to carry out the calculations required for purposefully changing the configuration change points and to generate control commands for carrying out the configuration change measures that are subsequently used for automatically carrying out the configuration change measures or displayed to the pilot or the pilots in order to manually carry out the configuration change measures. An additional function module of the control and monitoring unit checks the available input parameters with respect to the fact whether the calculations required for purposefully changing the configuration change points can and/or may be carried out and therefore whether the method for realizing the landing approach in an optimized fashion can be carried out.

The flight control module 50 generally generates actuating commands CS (FIG. 3) for moving control flaps K of the aircraft F that may comprise, in particular, —control flaps such as, e.g., spoilers 12a, 12b, ailerons 11a, 11b, rudders or elevators. FIG. 3 shows an aircraft system, in which specifications for regulating or adjusting high-lift bodies, particularly leading edge high-lift flaps VK and trailing edge high-lift flaps HK in the embodiment shown, are transmitted to the control and monitoring function 70 of the high-lift system via a functional connection that may comprise a line or generally a functional interface, wherein the control and monitoring function 70 of the high-lift system generates actuating commands C1 for a drive unit P based on the aforementioned specifications and transmits these actuating commands to the drive unit. This unit in turn generates and transmits actuating commands C-VK to a drive unit A-VK of at least one respective leading edge high-lift flap VK and/or actuating commands C-HK to a drive unit A-HK of one respective trailing edge high-lift flap HK. The position of the respective leading edge high-lift flap VK and optionally at least one derivative of the position are acquired on the leading edge high-lift flap by means of sensors and transmitted to the flight control module 50 as feedback F-VK. Alternatively, the feedback F-VK of the respective leading edge high-lift flap VK may be transmitted to the control and monitoring function 70 of the high-lift system HAS in order to monitor the movement, the behavior and the position of the at least one respective leading edge high-lift flap VK. Analogously, the position of the respective trailing edge high-lift flap HK and optionally at least one derivative of the position are acquired on the trailing edge high-lift flap HK and transmitted to the control and monitoring function 70 as feedback F-HK. Alternatively, it would be possible to transmit the feedback F-HK of the respective trailing edge high-lift flap HK to the flight control module 50 of the high-lift system in order to monitor the movement, the behavior and the position of the respective leading edge high-lift flap VK and trailing edge high-lift flap HK.

The control unit or the flight management system FMS, into which the flight control module 50 is integrated in the embodiment illustrated in FIG. 3, determines current actuating commands or a current actuating signal vector CS, particularly in the form of an actuating signal vector, for actuating drives of the control flaps of the aircraft, particularly the actuating drives of the ailerons and/or the spoilers and/or the elevators and/or an engine thrust adjusting unit, based on the nominal specifications 30a of the specification device 30 and optionally based on the sensor signals 40a of the flight status sensor unit 40. The nominal specifications 30a as input signals of the control unit C may correspond to a nominal lift status, a nominal angle of attack, a nominal yaw angle, a nominal speed, a nominal vertical speed, an aerodynamic parameter such as the ratio between the coefficient of drag and the coefficient of lift and/or a nominal acceleration of the aircraft or a combination of these values or be derived from these values or a combination thereof and generally define a nominal status of the aircraft.

At least one actuating drive and/or drive unit is assigned to the respective control flaps provided on the aircraft such as, e.g., the ailerons 11a, 11b and the respective spoilers 12a and 12b, wherein said actuating drive or drive unit is respectively regulated by the flight control unit with command signals in the form of nominal commands in order to adjust the respectively assigned control flaps and to thusly control the aircraft F. In this case, one (of these control flaps may be respectively assigned an actuating drive or a plurality of actuating drives in order to increase the failure safety of the aircraft system.

The flight control module 50 features a control function that receives control commands from the control input device and sensor values from the sensor unit, particularly flight status variables acquired and/or calculated by the sensor unit. The control function is realized in such a way that it generates actuating commands for the actuating drives in dependence on the control commands and the acquired and/or calculated flight status variables and transmits these actuating commands to the actuating drives such that the aircraft F is controlled in accordance with the control commands due to the activation of the actuating drives.

The flight control module 50 may be connected to the air data sensor unit 41 and the inertial sensor unit 42, in particular, via a digital data bus DB. The flight control module 50 may comprise a software module or hardware, on which the described functionality of the flight control module 50 is functionally implemented, i.e., particularly in the form of software.

In addition to the flight control module 50 and the sensor unit, other aircraft system modules may be connected to one another via a data bus or a data bus system DB.

Inventive embodiments of the high-lift system HAS are illustrated in FIGS. 2 and 3 using the example of a device for adjusting trailing edge lifting bodies 14a, 14b. The high-lift system HAS may alternatively or additionally feature a device for adjusting leading edge lifting bodies 13a, 13b.

FIG. 2 shows an embodiment of the inventive actuating system in the form of a high-lift system HAS for adjusting at least one control flap in the form of a lifting body A1, A2, B1, B2 and, in particular, at least one landing flap on each airfoil. FIG. 2 shows two landing flaps on each respective airfoil (that is not illustrated in FIG. 2). This figure specifically shows: an inner landing flap A1 and an outer landing flap A2 on a first airfoil and an inner landing flap B1 and an outer landing flap B2 on a second airfoil. In the inventive high-lift system, one or more than two landing flaps may also be provided per airfoil. In order to adjust the lifting body A1, A2, B1, B2, it is coupled by means of at least two guide mechanisms A11, A12, B11, B12, A21, A22, B21, B22 that are coupled to each control flap A1, A2, B1, B2 and spaced apart from one another in the wingspan direction of the lifting bodies A1, A2, B1, B2.

The actuating function may be realized, in particular, by means of an actuating mechanism. In the embodiment of the high-lift system HAS illustrated in FIG. 2, two actuating mechanisms SM are provided per lifting body.

The high-lift system HAS may be activated and controlled by means of a high-lift system pilot interface C2 that may feature, in particular, an activation element such as, e.g., an activation lever or an activation input panel that is respectively realized in such a way that a command signal C2a for adjusting the lifting body in accordance with the adjusting position of the activation element can be generated due to the adjustment of the activation lever or due to an input on the activation input panel and transmitted to the control and monitoring unit C. The high-lift system pilot interface C2 may be alternatively or additionally integrated, in particular, into the flight management system and/or control input device or specification device 30. The high-lift system pilot interface C2 serves for adjusting the takeoff configuration of the leading edge lifting bodies 13a, 13b and/or the trailing edge lifting bodies 14a, 14b, for pre-selecting the landing configuration and for inputting other operating commands that influence the automatic control. The high-lift system pilot interface C2 is functionally coupled to the control and monitoring unit C that transmit control commands for regulating the drive unit P via a control line C1. In the embodiment according to FIG. 2, the control and monitoring unit C is realized in the form of a so-called "central" control and monitoring unit C that, in particular, monitors itself with respect to its integrity, i.e., it features control and monitoring functions for several and, in particular, all adjusting mechanisms A11, A12, B11, B12, A21, A22, B21, B22 of the high-lift system HAS.

The drive unit P that is functionally connected to the control and monitoring unit C by means of the control connection or control line C1 is activated due to the activation of the high-lift system pilot interface C2 or due to commands that are generated by an automatic operating mode implemented in the control and monitoring unit C in order to adjust the lifting bodies that are collectively identified by the reference symbol K in FIG. 2 in dependence on the received control commands by means of the aforementioned suitable mechanical actuating mechanisms SM. The control and monitoring unit C may form a component of an on-board computer that this implemented in the form of software and, in addition to other functions, also comprises functions for acquiring, conditioning and forwarding data relevant to the operation of the aircraft.

The control and monitoring unit C may also form a component of the flight management system FMS that is implemented in the form of software and/or hardware. Consequently, the functions for controlling and monitoring the high-lift system HAS generally do not have to be integrated into a separate hardware module, but may also be integrated into another hardware module in the form of a function module, e.g., into the hardware module, in which the flight management system FMS is implemented.

The control connection or control line C1 between the control and monitoring unit C and the drive unit P comprises on the one hand the transmission of commands for adjusting the leading edge lifting bodies 13a, 13b and/or the trailing edge lifting bodies 14a, 14b into the respective positions determined by the control and monitoring unit C or ordered by means of the high-lift system pilot interface C2 and on the other hand the transmission of feedbacks on the configuration assumed by the leading edge lifting aids 13a, 13b and/or trailing edge lifting aids 14a, 14b to the control and monitoring unit C.

Figure 10:
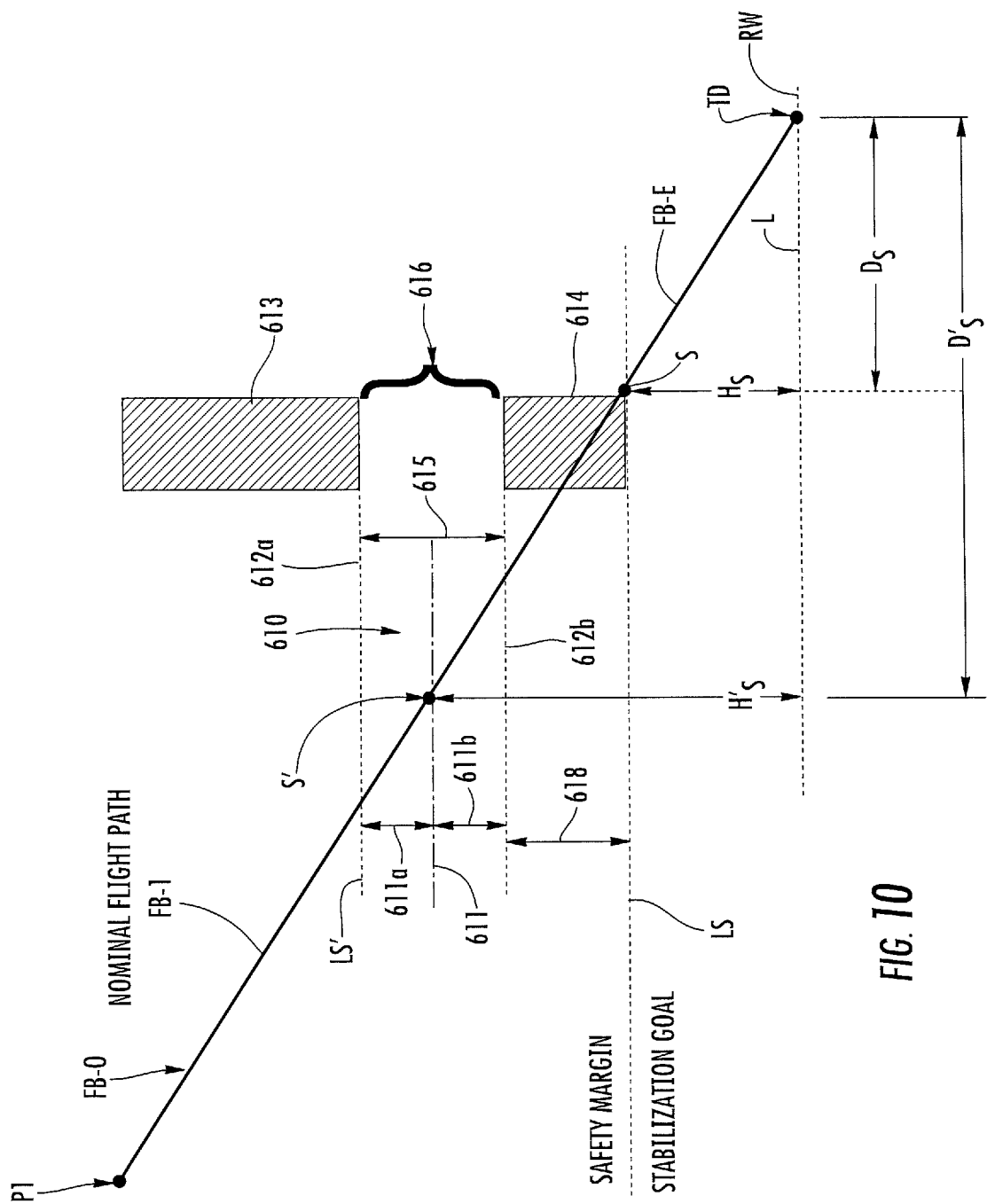
FIG. 10 shows the illustration of a stabilization point and stabilization region provided in accordance with the invention.

According to the invention, at least one configuration change measure is carried out in at least one determined flight path section, particularly in a stabilization flight path section FB-1 (see FIG. 10). An inventive configuration change measure is respectively assigned to a configuration change condition. If such a configuration change condition is fulfilled during the flight of the aircraft, the respectively assigned configuration change measure is carried out during the inventive method.

According to an embodiment of the invention, four or at least four configurations of a main wing and a leading edge lifting aid 13a, 13b and/or trailing edge lifting body 14a, 14b relative to the respective main wing are provided and referred to as airfoil configurations and generally also as configurations in this description:

| Configuration n | $\delta_V$ | $\delta_H$ | Flight phase | | |
|---|---|---|---|---|---|
| 0 | 0 Degrees | 0 Degrees | | Holding flight | Cruising |
| 1 | 15 Degrees | 0 Degrees | Takeoff | | Holding flight |
| 2 | 20 Degrees | 20 Degrees | Takeoff | Landing | Approach |
| 3 | 20 Degrees | 30 Degrees | | Landing | |

In the presently described exemplary embodiment, the high-lift system has n=4 discrete configurations n that are identified by n=0, 1, 2 and 3. In other exemplary embodiments, the system may also have a smaller or larger number of configurations up to a continuous adjustment of the lifting aids and at least two configurations. The preceding table contains exemplary combinations of possible adjusting states or adjusting positions $\delta_V$ for the adjusting angle or deflection angle or the adjusting position of the leading edge lifting aids 13a, 13b and possible adjusting states or adjusting positions $\delta_H$ for the adjusting angle or deflection angle or the adjusting position of the trailing edge lifting aids and 14a, 14b. In a high-lift system HAS that does not feature any leading edge lifting aids 13a, 13b, but only trailing edge lifting aids 14a, 14b, adjusting states of the at least one trailing edge lifting aid 14a, 14b may be realized in accordance with this table.

The drive unit P or drive units assign(s) the ordered positions that belong to the respective configuration specifications of the "central" control and monitoring unit C to the leading edge lifting bodies 13a, 13b and/or trailing edge lifting bodies 14a, 14b in accordance with this table. The table furthermore contains the exemplary assignment of the configurations to the individual flight phases.

The definition of the configuration change flight statuses is provided for controlling or adjusting the at least one leading edge lifting aid 13a, 13b and/or trailing edge lifting aid 14a, 14b and, in particular, for operating modes with an automatic control or adjustment of lifting bodies. These are predetermined flight statuses of the aircraft or flight statuses to be determined by means of corresponding sensors, in which changes of the configuration of the airfoils, i.e., changes of the adjusting state of the at least one lifting aid or the at least one leading edge lifting aid 13a, 13b and/or trailing edge lifting aid 14a, 14b on the respective main wing, are carried out by the high-lift system HAS with the aid of the drive unit P or drive units. The configuration change flight statuses used as benchmark for controlling or adjusting the respective lifting aid may comprise, in particular: the current speed of the aircraft and/or a current position of the aircraft that may be a position in space or a distance from a reference landing point and/or an altitude and/or a variable derived from the current position of the aircraft and/or a time within the flight that can be derived from the aforementioned specific configuration change flight statuses, in particular, based on a predetermined flight path and optionally also based on given flying conditions such as, e.g., wind conditions. The aircraft speed used may comprise, in particular, a calibrated airspeed CAS that is based on an air data measurement by means of the sensor unit 41. The determined flight statuses that are used as configuration change flight statuses, i.e., as benchmark for controlling or adjusting the respective lifting aid, are preferably smoothed by means of a low-pass filter prior to their further use in order to compensate brief disruptions of the signal that may be caused, for example, by turbulence.

According to an embodiment of the invention, the control and monitoring unit C has at least one operating mode, in which the adjusting states n of the leading edge lifting aid 13a, 13b and/or trailing edge lifting aid 14a, 14b can be adjusted without manual input by the pilot. These functions form the basis for the operating modes "basic landing maneuver operating mode," "advanced landing maneuver operating mode" and "managed landing maneuver operating mode." These operating modes are realized by means of a computational algorithm that is implemented in the control and monitoring unit C and generates a signal for extending or retracting the lifting bodies or high-lift aids that is transmitted to the drive unit P or drive units in order to adjust the lifting bodies or high-lift aids.

In this case, the high-lift system pilot interface C2 may be realized, in particular, in such a way that it does not feature an activation element in the form of a flap lever, but rather a control menu in the cockpit display for adjusting and monitoring the high-lift system HAS.

Figure 5:
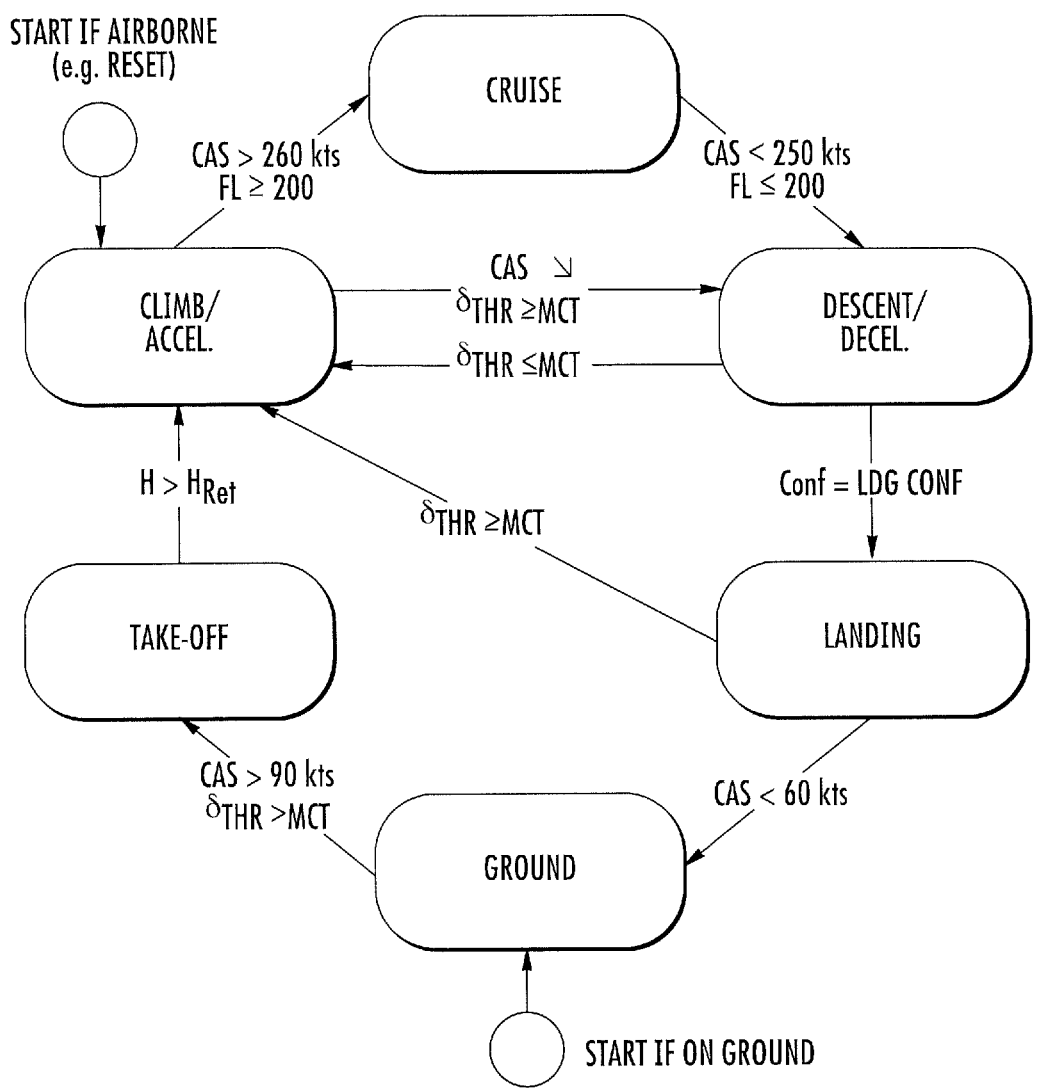
FIG. 5 shows a flow chart for changing over between flight operating modes of the aircraft (flight phase identification function)

According to an aspect of the invention, a landing maneuver for carrying out the landing of an aircraft on a runway based on current aircraft data and/or flight status data is proposed, wherein said method is at first manually initiated by the pilot based on an input by means of the high-lift system pilot interface C2 or by detecting the flight phase "landing" with the aid of a flight phase identification function (see FIG. 5).

The flight phase identification function (FIG. 5) is realized, in particular, in such a way that it determines in dependence on certain parameters such as, for example, the thrust lever position $\delta_{THR}$ whether the aircraft is in a flight phase, in which an extension or retraction of the high-lift aids is required, and decides based on this determination whether determined speeds of the aircraft are used as configuration change speeds or switching airspeeds VCE for the extension of lifting bodies and/or as switching airspeeds VCR for the retraction of lifting bodies. In other flight phases identified by means of the flight phase identification function such as, e.g., the take-off ("take-off" between the beginning of the take-off run and reaching a specified minimum altitude) or the landing ("landing" between assuming the landing configuration and respectively reaching the runway taxiing speed on the ground or initiating a missed approach procedure in the air), it would be possible to principally prevent an adjustment of the high-lift aids.

The flight phase identification function may be realized, in particular, in the form of a function module for identifying operating modes in the control and monitoring unit C. It may be realized, in particular, in such a way that it receives a current speed value and a value for the current flight altitude. In this case, it would be possible that the speed value and the value for the flight altitude are made available and transmitted to the control and monitoring unit C by the flight status sensor unit 40. The speed value may comprise a "calibrated airspeed" CAS. The value for the current flight altitude may comprise, in particular, the altitude of the aircraft referred to the ground and/or a barometric altitude and/or an altitude of the aircraft above the touchdown point at the destination airport. A limiting value or nominal range for the speed of the aircraft that is assigned to the operating mode "landing" and a limiting value or nominal range for the flight altitude of the aircraft that is assigned to the operating mode "landing" are provided in the identification function and the operating mode "landing" is assigned to the current flight status, i.e., the current flight status is identified as the operating mode "landing." The identification function assigns the operating mode "landing" to the flight status of the aircraft if the current speed value received by this identification function and the current flight altitude received by this identification function fall short of the respective limiting value or lie in the predefined nominal range assigned to the operating mode "landing." If the invention is applied to a high-lift system of a cargo plane or commercial aircraft, it would be possible, in particular, that the speed limiting value assigned to the operating mode "landing" lies in the range between 200 knots and 300 knots, particularly between 220 knots and 270 knots, or the nominal speed range assigned to the operating mode "landing" lies between 200 knots and 300 knots, particularly between 220 knots and 270 knots. If the invention is applied to a high-lift system of a cargo plane or commercial aircraft, it would furthermore be possible, in particular, that the altitude limiting value assigned to the operating mode "landing" lies in the range between 15,000 ft and 25,000 ft, particularly between 18,000 ft and 22,000 ft, or the nominal range lies between 18,000 ft and 22,000 ft. In addition, it would be possible that the nominal engine thrust command $\delta_{THR}$ lies in a nominal range assigned to the flight phase "landing" in order to detect the flight phase "landing."

FIG. 5 shows in an exemplary fashion how predefined flight phases are identified by means of the flight phase identification function due to the fulfillment of parameter values, particularly CAS<250 kts and flight altitude (in this case expressed in the form of flight level FL=flight altitude/100 ft; FL=200 therefore corresponds to 20,000 ft) FL<200, wherein said predefined flight phases are in FIG. 5 identified by "cruise" for the cruising flight of the aircraft F and "descent/decel." for a flight phase of the aircraft F, in which its flight altitude and/or airspeed are/is reduced. In this illustration, "MCT" is a predefined limiting value for the nominal thrust command $\delta_{THR}$. In FIG. 5, $H_{Ref}$ identifies a value that needs to be selected by the pilot and indicates the minimum flight altitude, beginning at which a retraction of the high-lift aids is permissible, and LDG CONF identifies the state of the high-lift aids that is intended for the landing and selected by the pilot.

The landing maneuver for carrying out the landing of an aircraft on an airstrip is realized in such a way that, after initiating the landing maneuver, the availability of current data that is required as input values and concerns special parameters of the aircraft flight status and the aircraft system status from a predetermined group of parameters of the aircraft flight status and the aircraft system status is determined and a landing maneuver operating mode is subsequently selected from a group of at least two activatable landing maneuver operating modes. For this purpose, the control and monitoring unit C features a module for selecting landing maneuver operating modes that is also referred to as "operating mode selection" module in this description, wherein the control and monitoring unit C is functionally connected to the flight status sensor unit 40 in order to receive values of parameters of the aircraft flight status and to an aircraft system in order to receive values of parameters of the aircraft system status in the form of respective input variables for the "operating mode selection" module for selecting landing maneuver operating modes. In this case, the aircraft system may comprise, in particular, the flight management system FMS.

In this case, the "operating mode selection" module for selecting landing maneuver operating modes is realized in such a way that it selects from a group of at least two activatable landing maneuver operating modes that respectively require a different number of parameters of the aircraft flight status and the aircraft system status as input variables the landing maneuver operating mode, for which all respectively required parameters of the aircraft flight status and the aircraft system status are available as input values and which respectively requires the larger number of such parameters. A landing maneuver operating mode therefore is selected, in particular, from a group of at least two activatable landing maneuver operating modes such as, for example,

- a "basic landing maneuver operating mode" or "basic mode,"
- an "advanced landing maneuver operating mode" or "advanced mode,"
- a "managed landing maneuver operating mode" (method for planning and carrying out a landing approach) or "managed mode".

Figure 6:
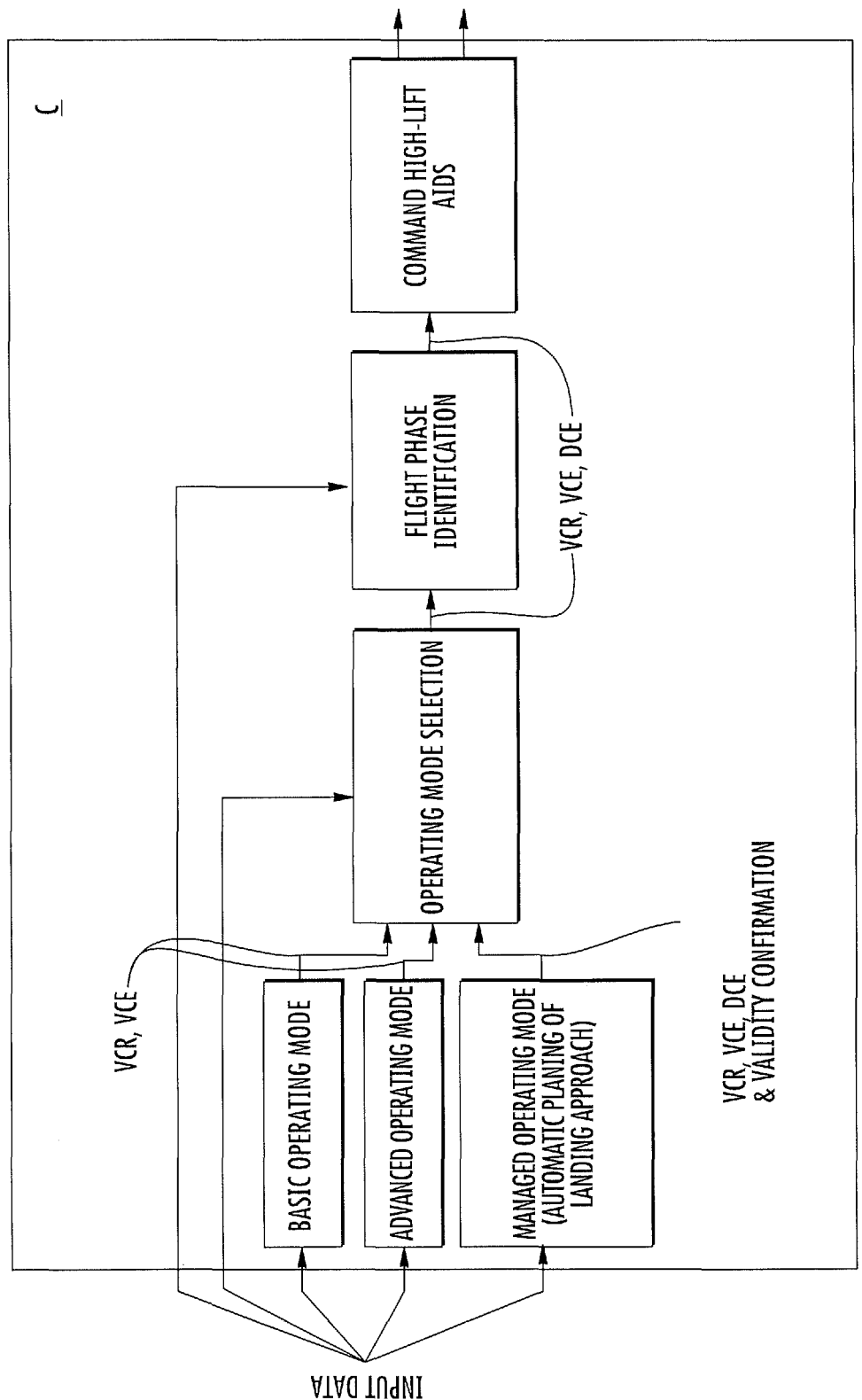
FIG. 6 shows a functional illustration of a control and monitoring unit for a high-lift system provided in accordance with an aspect of the invention, wherein said control and monitoring unit features function modules, in which one landing maneuver operating mode is respectively realized, and with a function module for selecting the landing maneuver operating mode.

The selection is realized, in particular, in that the at least two activatable landing maneuver operating modes respectively require a different number of parameters of the aircraft flight status and the aircraft system status as input variables, and in that the landing maneuver operating mode is identified that respectively requires the larger number of such parameters and for which all required parameters of the aircraft flight status and the aircraft system status were determined to be available as input values (merely indicated in the illustration according to FIG. 6 with general functions and switching functions that are not described herein under the "operating mode selection" module).

The identified landing maneuver operating mode is then activated based on the selection of a landing maneuver operating mode and the landing maneuver is carried out with the identified landing maneuver operating mode.

The control and monitoring unit C may be realized, in particular, in such a way that it provides a manual landing maneuver operating mode, in which no predetermined switching conditions or switching conditions to be determined within the respective landing maneuver operating mode for the adjustment of the leading edge lifting aids 13a, 13b and/or trailing edge lifting aids 14a, 14b are provided and therefore also no parameters, for which current input values are required, wherein the adjustment of the leading edge lifting aids 13a, 13b and/or trailing edge lifting aids 14a, 14b is in this case rather realized due to manual inputs of the pilot.

The control and monitoring unit C may be realized, in particular, in such a way that it alternatively or additionally provides a basic operating mode (not illustrated in FIG. 6) or basic landing maneuver operating mode that calls for or requires a small or minimal number of such parameters of the aircraft flight status. This basic operating mode may be realized, in particular, in such a way that it requires at least the current airspeed, particularly CAS, as input variable. The basic operating mode may alternatively or additionally be realized in such a way that also requires the current flight altitude as additional input variable. For this purpose, the control and monitoring unit C is realized in such a way that it receives an airspeed and a flight altitude from the flight status sensor unit 40, particularly the air data sensor unit 41 and/or the inertial sensor unit 42, and/or a position measuring device such as a satellite navigation system. The basic operating mode may be realized, in particular, in such a way that it provides a fixed set of switching conditions, at the fulfillment of which the adjustment of the leading edge lifting aids 13a, 13b and/or trailing edge lifting aids 14a, 14b takes place. In this case, the switching conditions of the set of switching conditions may be respectively defined by an airspeed limiting value for the extension and the retraction of the leading edge lifting aids 13a, 13b and/or trailing edge lifting aids 14a, 14b or, depending on the respective embodiment, by a combination of an airspeed and a flight altitude for the respective extension and the retraction the leading edge lifting aids 13a, 13b and/or trailing edge lifting aids 14a, 14b.

Alternatively or additionally to one or more of the above-described landing maneuver operating modes, the control and monitoring unit C may be realized, in particular, in such a way that it provides a basic landing maneuver operating mode (referred to as "basic operating mode" in FIG. 6), the activation of which calls for or requires the presence of values of the following parameters of the aircraft flight status:

- sensor data from the flight status sensor unit 40 and, in particular, the air data sensor unit 41 and/or the inertial sensor unit 42 in order to determine the flight status of the aircraft, wherein this sensor data contains, in particular, an airspeed, particularly CAS, and a flight altitude, particularly a barometric altitude,
- data from other aircraft systems and/or data that is input by the crew such as, in particular, the position of the thrust lever $\delta_{THR}$ and/or the current aircraft weight and/or the intended configuration for take-off and landing.

Alternatively or additionally to one or more of the above-described landing maneuver operating modes, the control and monitoring unit C may be realized, in particular, in such a way that it provides an advanced landing maneuver operating mode (referred to as "advanced operating mode" in FIG. 6), the activation of which calls for or requires the presence of values of the following parameters of the aircraft flight status:

- sensor data from the flight status sensor unit 40 and, in particular, the air data sensor unit 41 and/or the inertial sensor unit 42 in order to determine the flight status of the aircraft, wherein this sensor data contains, in particular, an airspeed, particularly CAS, and a flight altitude, particularly a barometric altitude,
- data from other aircraft systems and/or data that is input by the crew such as, in particular, the position of the thrust lever $\delta_{THR}$ and/or the current aircraft weight and/or the intended configuration for take-off and landing, and
- a value that describes the energy status of the aircraft referred to a maximum energy that can be depleted until the landing takes place, wherein this value is made available, in particular, by another aircraft system, particularly the flight management system FMS.

Alternatively or additionally to one or more of the above-described landing maneuver operating modes, the control and monitoring unit C may be realized, in particular, in such a way that it provides an automatic landing approach planning function, the activation of which calls for or requires the presence of values of the following parameters of the aircraft flight status:

- sensor data from the flight status sensor unit 40 and, in particular, the air data sensor unit 41 and/or the inertial sensor unit 42 in order to determine the flight status of the aircraft, wherein this sensor data contains, in particular, an airspeed, particularly CAS, and a flight altitude, particularly a barometric altitude,
- optionally data from other aircraft systems and/or data that is input by the crew such as, in particular, the position of the thrust lever $\delta_{THR}$ and/or the current aircraft weight and/or the intended configuration for take-off and landing, and
- data from other aircraft systems and/or data that is input by the crew, namely: a position of the aircraft relative to the destination airport including the altitude above the touchdown point and the planned flight path there and, according to an embodiment of the automatic landing approach planning function, furthermore signaled or measured wind data.

In FIG. 6, the "operating mode selection" module represents an embodiment, in which the above-described operating modes are implemented and can be adjusted.

Other input data may generally be provided for each of the described operating modes, particularly a signal that indicates whether the aircraft is located on the ground or in the air ("aircraft-on-ground signal").

An algorithm for the flight phase identification or a flight phase identification module (see FIG. 5, "flight phase identification" in FIG. 6) as a component of the control and monitoring unit C determines in dependence on certain parameters such as, for example, the thrust lever position whether the aircraft is in a flight phase, in which an extension or retraction of the high-lift aids is required, and decides based on this determination whether the VCE values or the VCR values are used for adjusting the high-lift aids (FIG. 5). In this case, VCR or $VCR_i$ (identified by VCR1, VCR2 or VCR3 in FIG. 7) generally lies closer to the speed VMINOP than VCE (identified by VCE1, VCE2 or VCE3 in FIG. 7), which is the reason why this decision is of major importance.

During certain flight phases such as, e.g., the take-off (take-off between the beginning of the take-off run and reaching a specified minimum altitude) or the landing (landing between assuming the landing configuration and respectively reaching the runway taxiing speed on the ground or initiating a missed approach procedure in the air), an adjustment of the high-lift aids is principally prevented.

According to the invention, it is proposed that an adjustment of an overall aerodynamic profile configuration of airfoils of the aircraft F is changed, particularly in the form of an extension of the lifting aids, when the speed of the aircraft is reduced during the planning or during the flight in order to achieve a higher drag-lift ratio of the airfoils, namely as soon as this changed overall aerodynamic profile configuration is permissible for the aircraft.

Vice versa, an adjustment of an overall aerodynamic profile configuration of airfoils of the aircraft F is changed, particularly in the form of a retraction of the lifting aids, when the speed of the aircraft is increased during the planning or during the flight in order to achieve a lower drag-lift ratio of the airfoils, namely as soon as this changed overall aerodynamic profile configuration is permissible for the aircraft.

An aircraft has flight envelopes, in which it would be permissible to change the adjustment of an overall aerodynamic profile configuration of airfoils of the aircraft F in order to achieve a lower drag-lift ratio of the airfoils, as well as to achieve a higher drag-lift ratio of the airfoils. In these flight envelopes, it is therefore possible, e.g., to retract or also to extend the high-lift aids. According to an embodiment of the invention, the flight phase identification described with reference to FIG. 5 is used for deciding whether the overall profile configuration of airfoils of the aircraft F can be changed in both directions as described in the respective flight envelope. In this case, the overall profile configuration of the airfoils is changed in the direction, on which the flight phase identification described with reference to FIG. 5 is based.

According to the invention, it is in this case proposed, in particular, that the overall profile configuration is in the aforementioned flight envelopes, in which a change of the overall profile configuration of airfoils of the aircraft F is permissible, changed in such a way, particularly in the form of a retraction of the high-lift aids, that an adjustment of an overall aerodynamic profile configuration of airfoils of the aircraft F is changed in order to achieve a lower drag-lift ratio of the airfoils in the flight phases "take-off" or "climb/accel." (FIG. 5, left part of structogram), in which the aircraft F is in an acceleration phase, namely as soon as this changed overall aerodynamic profile configuration is permissible for the aircraft.

According to the invention, it is vice versa proposed, in particular, that the overall profile configuration is in the aforementioned flight envelopes, in which a change of the overall profile configuration of airfoils of the aircraft F is permissible, changed in such a way, particularly in the form of an extension of the high-lift aids, that an adjustment of an overall aerodynamic profile configuration of airfoils of the aircraft F is changed in order to achieve a higher drag-lift ratio of the airfoils in the flight phases "descent/deceleration" or "landing" (FIG. 5, right part of structogram), in which the aircraft F is in a deceleration phase, namely as soon as this changed overall aerodynamic profile configuration is permissible for the aircraft.

Landing maneuver operating modes described herein are elucidated in greater detail below:

The basic landing maneuver operating mode or basic mode functionally represents a relatively simple and safe operating mode. In this operating mode, configuration change flight statuses, particularly limiting values for the airspeed, are provided as switching conditions or adjusting conditions. This operating mode adjusts the leading edge lifting aids 13*a*, 13*b* and/or trailing edge lifting aids 14*a*, 14*b* of the aircraft in dependence on the airspeed and optionally also the flight altitude, namely in such a way that the leading edge lifting aids 13*a*, 13*b* and/or trailing edge lifting aids 14*a*, 14*b* are extended when the aircraft assumes lower air speeds and retracted when the aircraft assumes higher air speeds. In this case, the speeds VCR, at which the switching processes for retracting the high-lift aids or the retraction configuration changes take place, are calculated in dependence on the aircraft weight in such a way that a safe minimum separation from the minimum speed of the next configuration is observed. During an extension of the high-lift aids, the switching speeds VCE lie below the maximum permissible speed of the next configuration by a fixed amount.

In order to describe the automatic control of the high-lift aids 13*a*, 13*b*, 14*a*, 14*b* in the basic landing maneuver operating mode or the basic mode, it is advantageous to define speeds that are important in connection with the aerodynamic airfoil configuration respectively assumed by the high-lift aids 13*a*, 13*b*, 14*a*, 14*b*. A calibrated airspeed that is based on an air data measurement may serve as primary benchmark for the control of the high-lift system HAS of the aircraft F that comprises the high-lift aids 13*a*, 13*b*, 14*a*, 14*b*. A signal representing the airspeed is smoothed by means of a low-pass filter prior to its further use in order to compensate brief disruptions of the signal that may be caused, for example, by turbulence.

Figure 7:
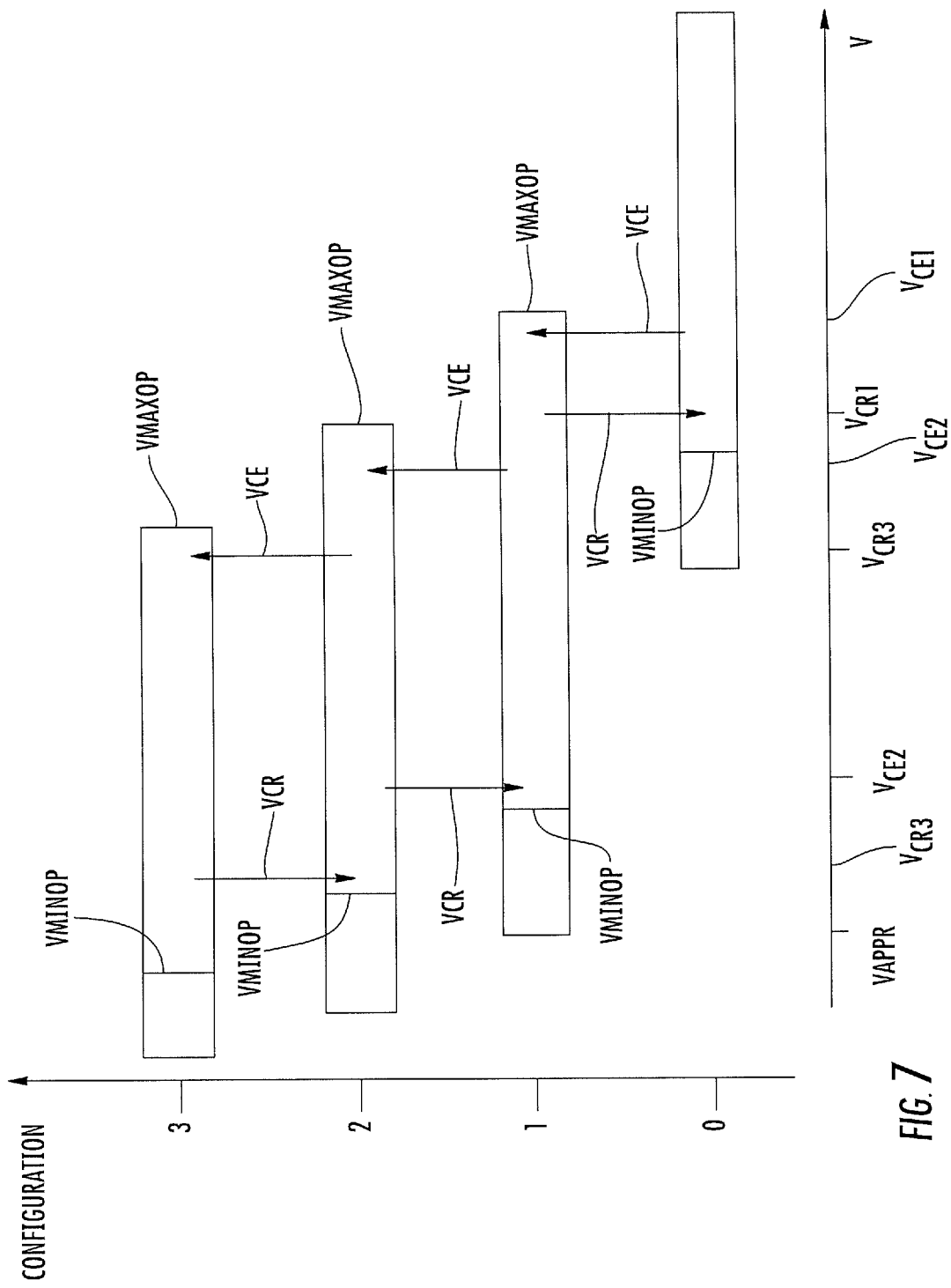
FIG. 7 shows an illustration of configuration changes in dependence on configuration change speeds for a basic operating mode of an inventive landing maneuver.
Figure 8:
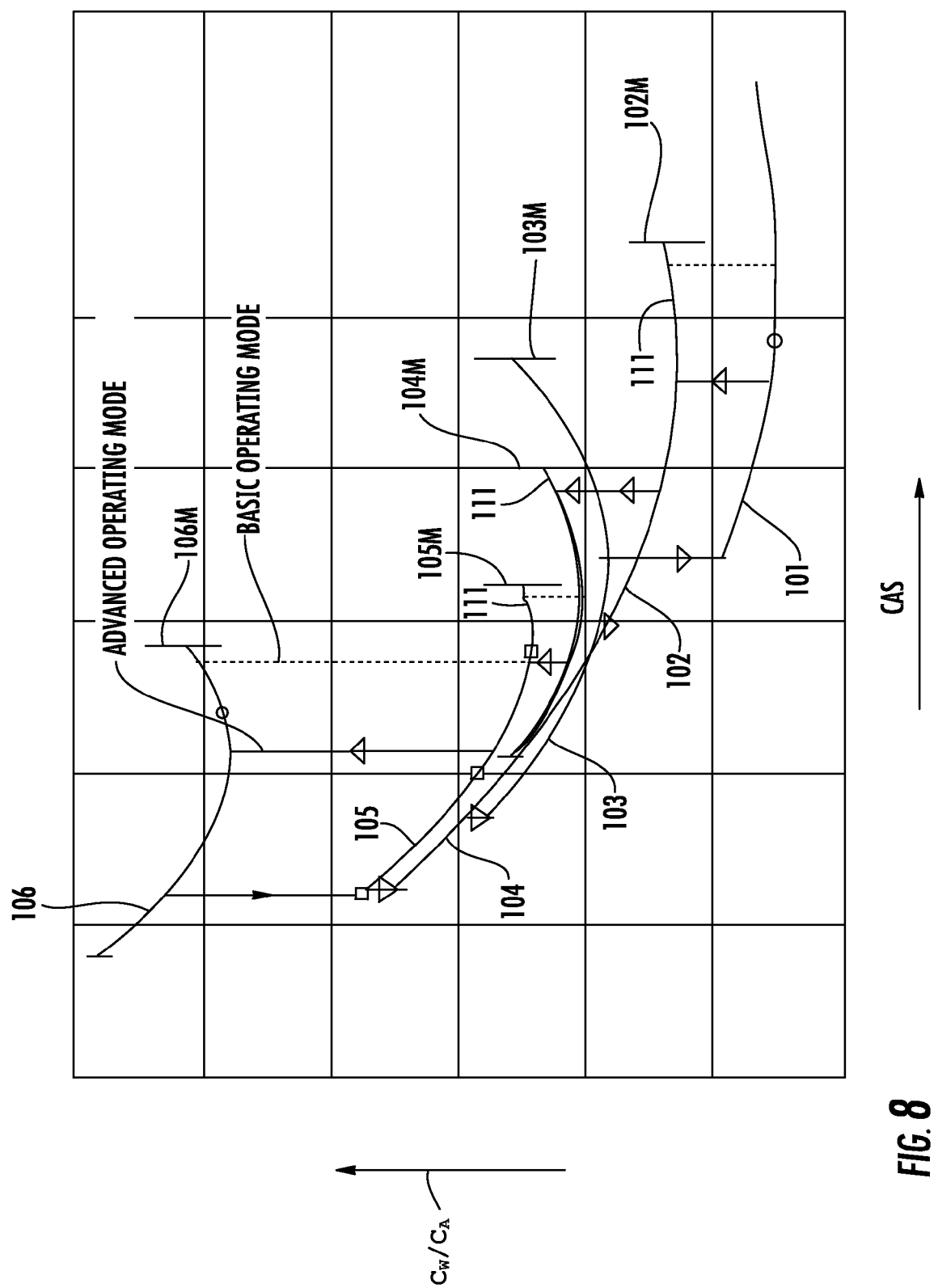
FIG. 8 shows an illustration of drag polars of airfoils and of configuration changes in dependence on configuration speeds that are carried out in dependence on these drag polars for an advanced operating mode of an inventive landing maneuver.

The normal operating range of an aircraft is limited by limiting operating speeds VMINOP (minimum speed) and VMAXOP (maximum speed), namely with retracted lifting aids 13*a*, 13*b*, 14*a*, 14*b* of the high-lift system, as well as with extended high-lift aids (see FIG. 7). FIGS. 7 and 8 elucidates the position of the individual switching speeds or configuration change speeds, i.e., the speeds, at which the adjusting state of the leading edge lifting aids 13*a*, 13*b* and/or trailing edge lifting aids 14*a*, 14*b* is changed, using an example of several adjacent configurations of the high-lift system HAS. In configuration 0, the leading edge lifting aids 13*a*, 13*b*, as well as the trailing edge lifting aids 14*a*, 14*b*, are in a completely retracted position that corresponds to a cruising flight position. In configuration 1, the lifting aids 13*a*, 13*b*, 14*a*, 14*b* are in an extended state, wherein it is irrelevant with respect to the function of the basic operating mode whether leading edge lifting aids 13a, 13b or trailing edge lifting aids 14a, 14b are extended or a combination of both flap types or other lifting aids is actuated as already explained above.

At the speed $VS1g_i$, in which i is an index for the individual configurations, the flow on the wing separates in configuration i when the lift of the aircraft F corresponds to the aircraft weight (load factor n=1). In addition to the respective configuration, this speed essentially depends on the actual mass of the aircraft and furthermore on the flight Mach number. A (higher) minimum operating speed $VMINOP_i$ for configuration i is attained by adding a safety margin to $VS1g_i$. In most instances, said safety margin is generally defined by means of factors $k_j$ such that $$VMINOP_i = k_j \cdot VS1g_i,$$

wherein the index j identifies the different factors k that can assume different values in dependence on the configuration, but also in dependence on the flight phase. The upper limit of the normal operating range of configuration i is formed by the maximum speed $VMAX\text{-}OP_i$. The definitions of the speeds $VS1g_0$ and $VMINOP_0$ in cruising flight configuration 0 are analogous to the definitions of $VS1g_i$ and $VMINOP_i$ in configuration i. The areas, in which the VMAXOP of one configuration, e.g., configuration 1, lie above the VMINOP of the next adjacent retracted configuration, e.g., configuration 0, represent a speed band, in which the airspeed lies in the normal operating ranges of both configurations, i.e., where sufficient lift for safe flying operations exists in both respectively observed adjacent configurations such as, e.g., configuration 1 and configuration 0. A maximum operating speed also exists, e.g., in configuration 0, i.e., at the upper end of the cruising flight speed range with completely retracted lifting aids 13a, 13b, 14a, 14b, but is irrelevant with respect to the automatic control of the high-lift system HAS.

The function of the basic landing maneuver operating mode is described below with reference to FIG. 7. The aircraft is decelerated after the cruising flight with a speed higher than the configuration change speed $VCE_1$, wherein this may take place in an approach segment with constant elevation, as well as in a slight descent. Once the speed falls short of $VCE_1$, a signal for extending the lifting aids 13a, 13b, 14a, 14b from configuration 0 or the cruising flight position into the first extended configuration 1 is generated. Additionally decelerating the aircraft leads to the speed successively falling short of the configuration change speeds $VCE_2$ and $VCE_3$ and therefore to the extension of the lifting aids 13a, 13b, 14a, 14b as far as the pre-selected landing configuration 3. The configuration change speed VCE that causes the adjustment of the lifting aids 13a, 13b, 14a, 14b into the intended landing configuration needs to be higher than the minimum operating speed of this configuration plus a speed margin. The magnitude of this speed margin results from required aircraft-specific allowances for wind and turbulence that are added to the reference speed for the final approach. Due to this rule, it is prevented that the configuration change speed that causes the change to the landing configuration is slower than the approach speed VAPPR. After assuming the intended landing configuration, the approach is continued with constant configuration and at least sectionally variable or constant approach speed VAPPR until the flare-out and the touchdown on the ground take place.

Figure 9:
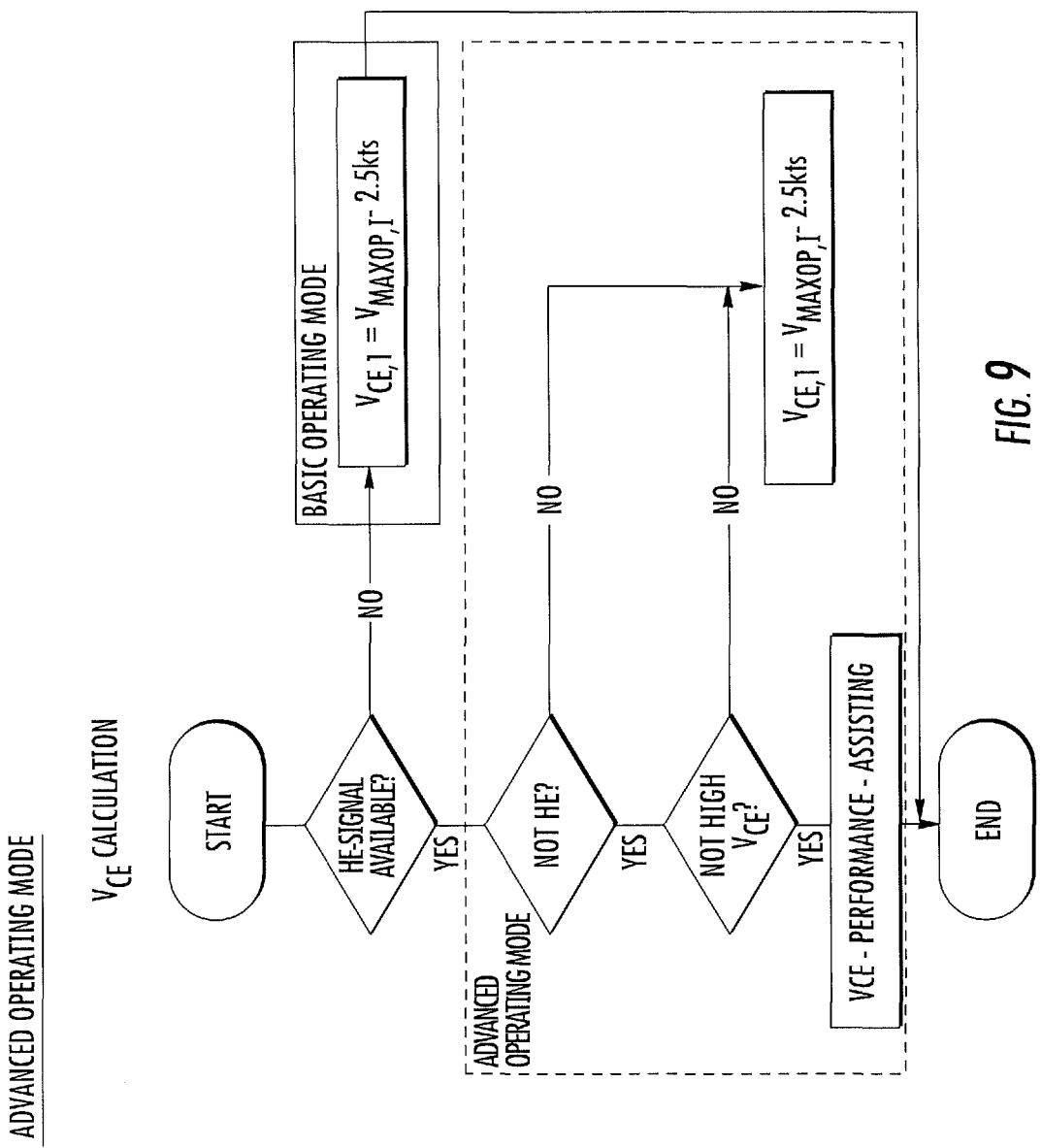
FIG. 9 shows a functional illustration of the change of configuration change speeds in the advanced operating mode.

Due to the addition of other input signals, the advanced landing maneuver operating mode or advanced mode allows an adaptation of the configuration change speeds in dependence on the flying performance. If the configuration change speeds VCE rather lie in the upper range of the permissible speed band for each configuration, i.e., near VMAXOP, the configuration already increases at relatively high speeds and the drag of an average approach is high, wherein this may be quite desirable in order to support the deceleration of the aircraft to the approach speed. In other embodiments, the configuration change speeds may also be specified in accordance with flying performance aspect, wherein the intervals between the configuration change speeds that are identified by the reference symbol 111 in FIG. 8 would be varied accordingly. One exemplary embodiment of such an adaptation of the configuration change speeds in dependence on the flying performance is the aforementioned "advanced operating mode." The algorithm that forms the basis of the flying performance-dependent adaptation of the VCE is illustrated in FIG. 9, in which it is possible to change over between high VCE and low VCE with the aid of a decision branch. The advanced operating mode can change over from the reduced VCE to the high VCE that is also used by the basic landing maneuver operating mode or the basic landing maneuver operating mode with the aid of two additional suitable input signals, one of which is provided by other aircraft systems and one of which is switchable due to pilot input. FIG. 9 shows an embodiment of such a change-over. In this figure, the value HE ("high energy") describes a logical variable that is obtained from other aircraft systems, wherein this logical variable comes true if the energy status of the aircraft is higher than a maximum energy that can be depleted until the landing and otherwise is incorrect. The value "high VCE" describes a logical variable that comes true if the high VCE is manually selected by the pilot and otherwise is incorrect. Due to the branches, it is possible to either select high VCE that in this embodiment always lie 2.5 knots below the VMAXOP of the configuration to be assumed or low VCE that are referred to as "performance-assisting."

In the case of an approach with high energy, during which as much drag as possible is required for the deceleration, for example, this makes it possible to extend the high-lift aids earlier than during a normal landing approach, in which the high-lift aids are extended at the lowest possible speeds and therefore late in the landing approach. This makes it possible to realize approaches with a particularly low drag and therefore a low fuel consumption and noise emission. The question which of the two last-described approaches ultimately should be preferred primarily depends on the approach maneuver and the boundary conditions, i.e., on the selected approach aids and the flight path control that is characterized by the altitude and speed profile to be reached, as well as atmospheric conditions.

If necessary, this operating mode also makes it possible to realize additional functions such as the temporary extension of the high-lift aids, for example, during a holding flight, by adding other input signals. It would be possible that this also takes place in the basic operating mode.

The function of the advanced operating mode is described below with reference to FIG. 8 that shows the drag-lift ratio (axis $C_W/C_A$) of the observed aircraft as a function of a speed range (axis CAS for a calibrated airspeed). The diagram reflects the part of the approach sequence illustrated in FIG. 7 until VAPPR is reached. In the exemplary embodiment shown, the configuration change speeds are defined by means of individual differential speeds. These differential speeds are selected specific to the aircraft and specific to the configuration.

FIG. 8 schematically shows speed polars 101, 102, 103, 104, 105, 106 for different configurations. The speed polars are specifically defined as follows:

the speed polar 101 describes a retracted position of the lifting aids, in which these lifting aids assume, in particular, a cruising flight position (configuration "0" in FIG. 7);

the speed polar 107 describes a first extended position of the lifting aids (configuration "1" in FIG. 7);

the speed polar 103 describes a second extended position of the lifting aids (configuration not illustrated in FIG. 7);

the speed polar 104 describes a third extended position of the lifting aids (configuration "2" in FIG. 7);

the speed polar 105 describes a fourth extended position of the lifting aids (configuration "3" in FIG. 7);

the speed polar 106 describes a fifth extended position of the lifting aids (not shown in FIG. 7).

In FIG. 8, the speed CAS, with which the high-lift aids are respectively extended, is illustrated with arrows that point in the direction of the increase of the drag-lift ratio (axis $C_W/C_A$) of the observed airfoil. In this type of airfoil configuration adjustment, the adjustment of the airfoil configuration (alternatively, e.g., by changing the cross-sectional profile of the airfoil) is generally carried out in such a way that the drag-lift ratio (axis $C_W/C_A$) of the observed airfoil respectively increases.

Analogously, the arrows that point in the direction of the decrease of the drag-lift ratio (axis $C_W/C_A$) of the observed airfoil indicate the speed CAS, with which the high-lift aids are respectively retracted.

FIG. 8 shows that the switching speeds VCE for extending the high-lift aids in order to improve the flying performance clearly lie below the maximum speed 102M, 103M, 104M, 105M, 106M for the respective configuration change and therefore below the VCE in FIG. 7. The margin of a configuration 0, 1, 2, 3, FULL referred to the upper limit of the configurations is respectively identified by the reference symbol 111 in FIG. 8 and ensures that a sufficient margin between the switching speed and the respective maximum switching speed is observed. The control and monitoring unit C may be realized in such a way that an incremental retraction of the leading edge lifting aids 13a, 13b or trailing edge lifting aids 14a, 14b is initiated if said switching speeds are exceeded. This retraction functionality combines already known protective functions that reduce the risk of impermissibly high loads occurring on the flaps by reducing the flap deflection with the operational necessity that the configurations can also be reduced in the approach operating mode without exceeding the maximum operating speeds 102M, 103M, 104M, 105M, 106M. The configuration change speeds are furthermore defined in such a way that falling short of VMINOP is improbable with consideration of the typical deceleration rates for the respective configuration and the influence of wind gusts. Since the landing gear significantly influences the drag, it is sensible to take the landing gear status (lowered/retracted) into consideration in the definition of these values.

Depending on the aircraft mass and the speed requirements, it may be necessary to extend the lifting aids 13a, 13b, 14a, 14b in the holding flight. An operating mode that is specifically defined for the holding flight is not provided in the present exemplary embodiment. Instead, the speed-dependent extension of the high-lift flaps is respectively realized in accordance with FIG. 7 and FIG. 8. The high-lift aids are retracted from configuration i into the next lower configuration i-1 when the switching speed VCR is exceeded and the flight phase identification module detects a change of the flight phase to a flight phase, in which the retraction of the high-lift aids is required.

The invention proposes, in particular, a function for automatically planning a landing approach that features a landing maneuver optimization function. This operating mode is also referred to as "managed landing maneuver operating mode" or "managed mode." The function for automatically planning a landing approach may be realized in the form of a functional component of the control and monitoring unit C as illustrated in FIG. 7. With this function, command signals C1 are generated by the control and monitoring unit C and transmitted to the drive unit P, by means of which the lifting aids 13a, 13b, 14a, 14b are extended in a situation-dependent fashion during the landing approach such that a predetermined optimization goal is attained.

According to an embodiment of the function for automatically planning a landing approach, a final approach condition is provided that may be defined, in particular, such that the aircraft should have reached a predetermined final approach flight status no later than in a stabilization region 610 and/or no later than at a stabilization point S. According to an embodiment of the function for automatically planning a landing approach, the final approach flight status is defined by a predetermined landing speed.

The stabilization point S may be defined, in particular, by a respective stabilization distance $D_S$ and a stabilization altitude $H_S$ referred to an airport landing reference point that may comprise, in particular, a landing reference point of the runway RW or a runway contour line L. If a landing flight status should be assumed in such a stabilization region or stabilization point S, the stabilization region or the stabilization point respectively has the function of a limiting region or a limiting altitude or a limiting distance. The landing reference point of the runway RW may comprise, in particular, the beginning of the runway or a point that lies a predetermined distance behind the beginning of the runway on the center line thereof. In this case, the stabilization distance $D_S$ is the horizontal distance between the local position of the stabilization point S and generally the airport landing reference point or the landing reference point of the runway RW. The stabilization altitude $H_S$ is the altitude relative to the landing reference point, i.e., the vertical distance between the actual position of the aircraft, in which the final approach flight status is reached, and the airport landing reference point or the landing reference point of the runway RW. The stabilization altitude $H_S$ may amount, in particular, to 1.000 ft or lie between 400 ft and 1.200 ft. The contour line belonging to the stabilization altitude $H_S$ is identified by the reference symbol "LS" in FIG. 10.

In order to increase the safety of the inventive landing method, it would be possible to use a greater safety stabilization altitude H'S or a contour line LS' that with respect to the level L of the runway is positioned higher than the required contour line instead of the stabilization altitude $H_S$ or the corresponding contour line LS that actually should be used based on the requirements of the inventive landing method that result, e.g., from general landing regulations. Such a constellation is illustrated in FIG. 10. This figure shows the stabilization point S that lies at the minimum stabilization altitude $H_S$ referred to the runway contour line L. According to an alternative embodiment of the inventive landing method, a safety stabilization altitude H'S and a safety stabilization point S' resulting thereof are used instead of the stabilization altitude $H_S$. A stabilization region 610 may be defined around the safety stabilization point S' and, according to an embodiment of the inventive landing method, realized in the form of an altitude corridor that is defined by the overall vertical distance 615 or a provided stabilization window 616, in which the aircraft should at the latest have reached a predetermined final approach flight status. According to the illustration in FIG. 10, this stabilization window 616 may be defined in such a way that it extends upward from a horizontal center line 611 that intersects the nominal flight path FB-0 in the safety stabilization point S' by a vertical distance 611*a* from the safety stabilization point S' and downward from this safety stabilization point by a vertical distance 611*b* such that an upper corridor line 612*a* and a lower corridor line 612*b* result. The overall vertical distance 615 that may be predetermined for the inventive landing method therefore comprise the sum of the vertical distance 611*a* and the vertical distance 611*b*. In the inventive landing method, the stabilization region 610 or the stabilization window 616 may be defined by specifying a concrete overall vertical distance 615 or by specifying a center line 611 extending through S' and the concrete vertical distances 611*a* and 611*b* from this center line. In this case, the magnitude of the overall vertical distance 615 or the vertical distances 611*a* and 611*b* can be selected, in particular, in dependence on a predetermined landing speed to be assumed and/or in dependence on a prediction rating number. This prediction rating number can be determined, in particular, by checking and evaluating the degree, by which the stabilization altitude predicted in an inventive deceleration predictor changes relative to a predefined maximum rate within a predefined time interval. If the maximum rate of the change of the predicted stabilization altitude is exceeded, in particular, the magnitude of the overall vertical distance 615 or the vertical distances 611*a* and 611*b* may be changed by a fixed amount. If the maximum rate of the change of the predicted stabilization altitude is exceeded, the magnitude of the overall vertical distance 615 or the vertical distances 611*a* and 611*b* may alternatively be changed by a variable amount that is dependent on the degree, by which this maximum rate is exceeded. In this embodiment, the inventive landing method therefore is realized in such a way that the predetermined final approach flight status of the aircraft cannot be reached in the region 613 above and in the region 614 underneath the altitude corridor or stabilization window 616. Alternatively, the stabilization window 616 may be defined differently in an inventive landing method. For example, the lower corridor line 612*b* may be identical to the contour line LS belonging to the stabilization altitude $H_S$.

The inventive function for automatically planning a landing approach ("managed") may be realized, in particular, in such a way that it specifies a stabilization region 610 and/or a stabilization point S or safety stabilization point S', as well as a nominal final approach flight path section FB-E that is predetermined with respect to its altitude profile and extends between the stabilization point S and/or the safety stabilization point S', in or at which the aircraft respectively should at the latest have reached a predetermined landing flight status and optionally should also assume a predetermined landing configuration, and a landing reference point referred to the runway, on which the aircraft should land, that comprises, in particular, a planned or predetermined touchdown point TD of the aircraft F.

In this respect, it is proposed, in particular, that the starting point of the nominal final approach flight path section FB-E is identical to the end point of the stabilization flight path section FB-1, i.e., that the stabilization flight path section FB-1 transforms into the nominal final approach flight path section FB-E. According to currently valid civil aviation regulations for carrying out landing approaches, the aircraft needs to fly along the nominal final approach flight path section FB-E with a constant flight path angle, a constant speed and a constant configuration until the landing is initiated. The term flight path angle or path angle of a nominal flight path section refers to the angle that this flight path section may, if applicable, locally assume relative to the horizontal plane, wherein a flight path section that leads to a decreased flight altitude has a negative flight path angle.

If these regulations do not have to be strictly observed, it would be possible, in particular, that the flight path angle of the nominal final approach flight path section FB-E is larger or smaller than the flight path angle of the stabilization flight path section FB-1 before its end point. This nominal final approach flight path section FB-E may alternatively or additionally be defined in the form of a flight path section with a speed or flight profile with constant speed up to the landing reference point or, e.g., with constantly decreasing speed up to the landing reference point. According to the invention, a different course of the nominal flight path section FB-E could generally also be assumed between the stabilization point S and the landing reference point, e.g. the fictitious touchdown point TD. The nominal flight path section between the stabilization point S and the fictitious touchdown point TD may, in particular, also be composed of a horizontal flight path section that begins at the stabilization point S and a subsequent nominal flight path section with constant rate of descent that extends up to the fictitious touchdown point TD. In this case, the final approach flight path section FB-E may also feature additional nominal flight path segments that have steeper or shallower flight path angles or may comprise a horizontal flight segment. The invention is not limited to the type and the number of such segments and angle specifications used.

According to an embodiment of the inventive method, it would also be possible that a configuration change condition is fulfilled, i.e., that an inventive configuration change measure is carried out on the airfoils, at the starting point of the nominal final approach flight path section FB-E or the end point of the stabilization flight path section FB-1. This may be realized, in particular, with the device for configuring the airfoils for the final approach, i.e., for completely extending the trailing edge high-lift bodies and/or leading edge high-lift bodies and/or for adjusting the maximum profile curvature of the main wings.

According to an embodiment of the inventive function for automatically planning a landing approach, a flight path is determined as stabilization flight path section FB-1 between the actual position of the aircraft F or a prospective planned actual position referred to the flying aircraft as starting point of the stabilization flight path section FB-1 and/or the stabilization point S and/or the safety stabilization point S' as end point of the stabilization flight path section FB-1.

The stabilization flight path section FB-1 may be defined, in particular, by:

at least one configuration change condition at a location between the starting point in the form of an actual position of the aircraft F or a prospective planned actual position referred to the flying aircraft and the end point S or S' of the stabilization flight path section FB-1, a speed profile of the stabilization flight path section FB-1 and/or an altitude profile of the stabilization flight path section FB-1.

The spatial stabilization region 610 and/or the stabilization point S, S' may also be defined, in particular, by a predetermined final approach flight status of the aircraft that serves as nominal flight status, i.e., the flight status to be reached by the aircraft at this location. The final approach flight status may be defined, in particular, in the form of a predetermined landing speed of the aircraft F and/or a predetermined flight altitude of the aircraft F referred to the ground and/or a predetermined distance from a planned touchdown point of the aircraft on the runway if the landing reference point and, in particular, the planned touchdown point of the aircraft on the runway lies distant from the stabilization region 610 and/or at the stabilization point S, S'. In the latter instance, it would be possible, particularly with respect to the landing reference point, that the aircraft F has an airfoil configuration provided for the final approach until the touchdown of the aircraft on the runway. With respect to the final approach, it could also be specified that the aircraft follows a defined altitude profile and/or speed profile, particularly also in the form of a nominal specification.

Figure 14:
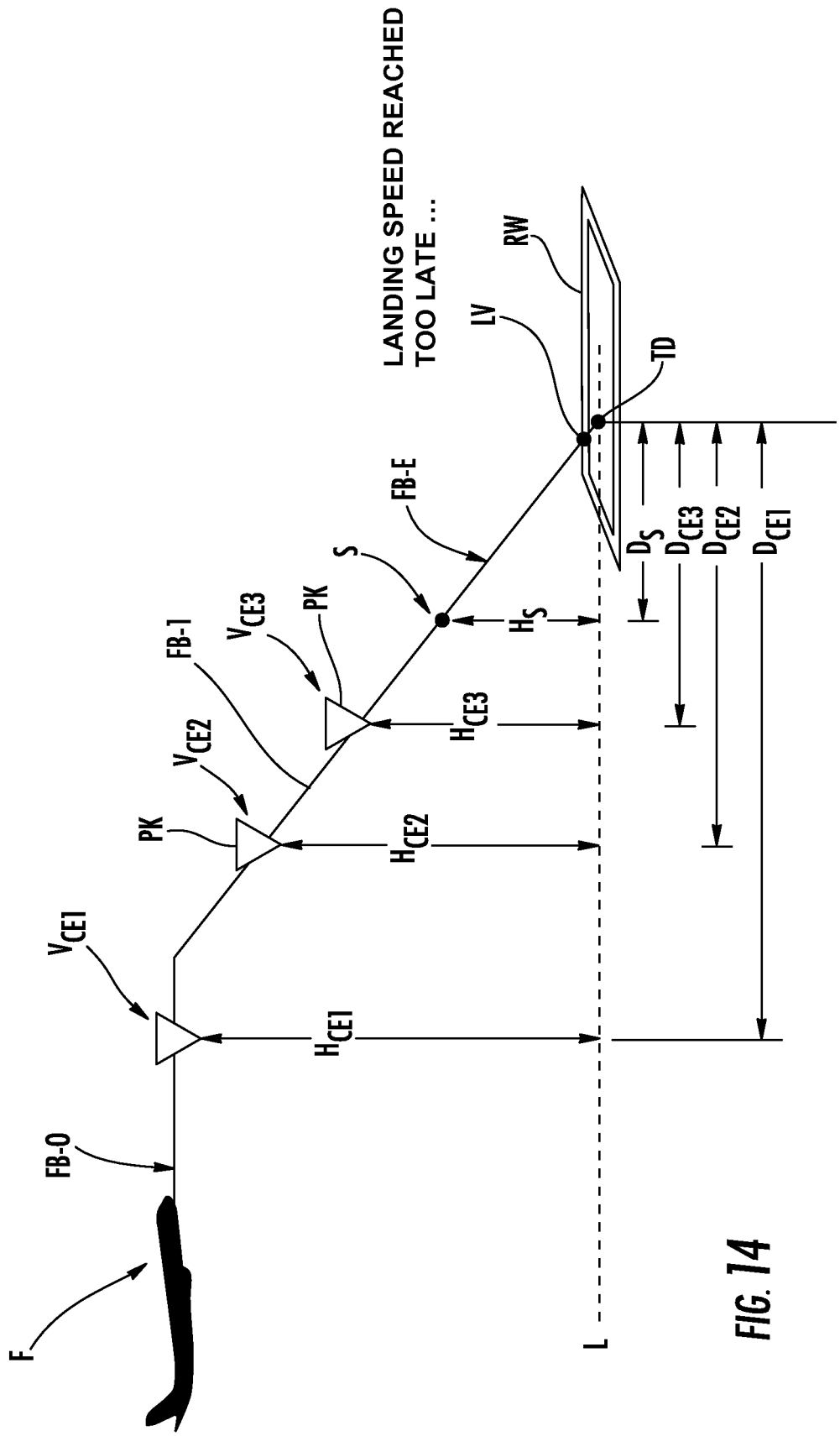
Figure 16:
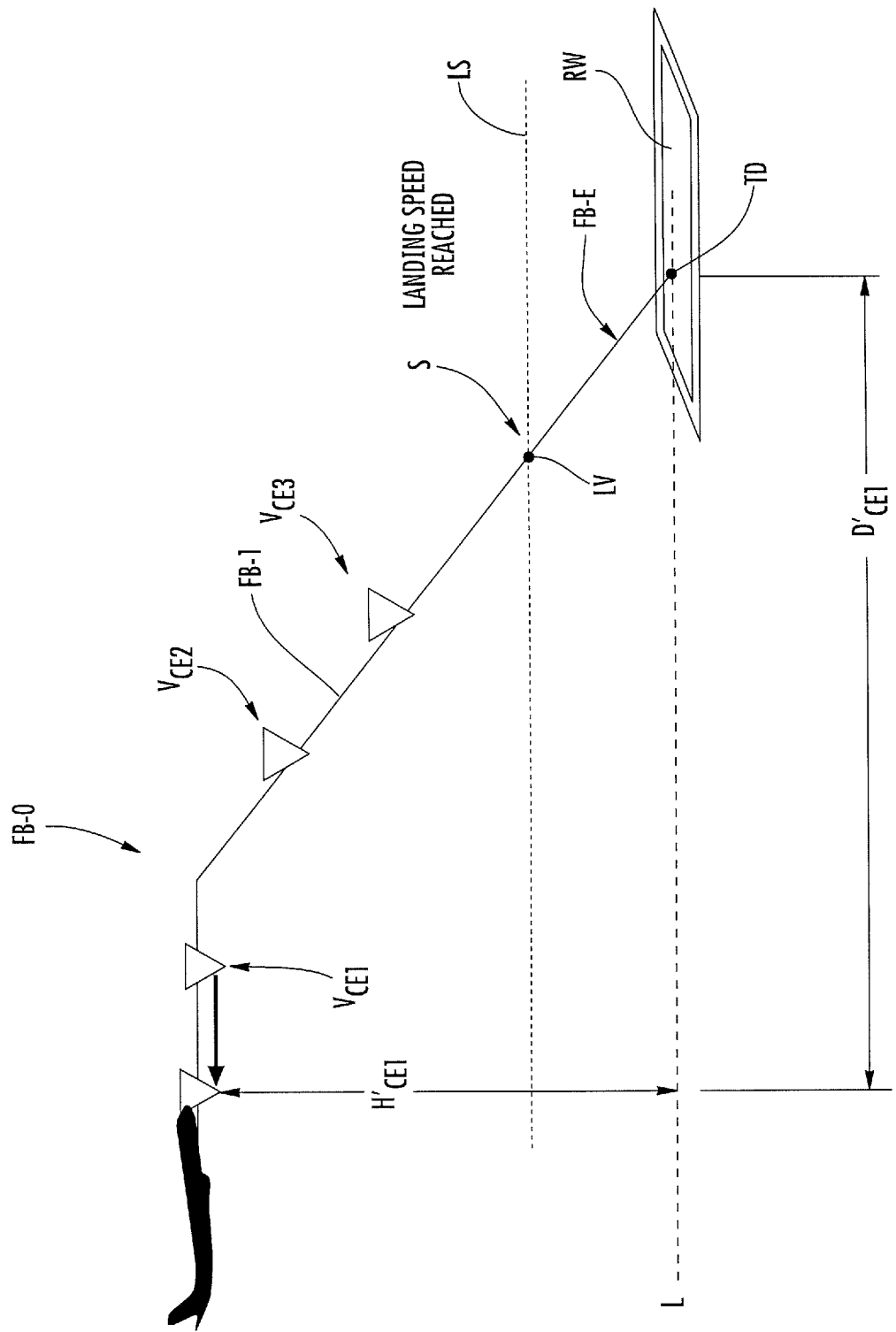

In the illustrations in FIGS. 14 and 16, a fictitious touchdown point TD is selected as landing reference point when a predetermined course of the nominal flight path FB-0 is selected starting from the stabilization point S or stabilization region 610. The fictitious touchdown point TD may be specified as a point, at which the aircraft should touch down on the runway RW or another reference point on the runway RW. According to an embodiment that is illustrated in FIG. 14, a certain course of the nominal final approach flight path section FB-E extending between the stabilization point S and the fictitious touchdown point TD is assumed to be part of the nominal flight path FB-0. In this embodiment of the inventive landing method, an altitude profile with a linearly descending gradient and, in particular, a constant descent of the aircraft F starting from the stabilization point S or stabilization region with a predefined speed profile such as a constant rate of descent up to at least a residual flight altitude may be provided for this nominal final approach flight path section FB-E. The residual flight altitude is a flight altitude referred to the ground and may have a value, in particular, between 0 ft and 150 ft, particularly between 15 ft and 100 ft.

The nominal final approach flight path section FB-E may alternatively or additionally be defined in that the aircraft touches down on the runway at a predetermined time, i.e., that the aircraft has reached a touchdown point TD on the runway RW at a predetermined time.

The stabilization flight path section FB-1 may be determined, in particular, as follows: a nominal flight path is generated starting from the actual position of the aircraft based on an assumed flight path inclination with fixed flight path angle, i.e., with constant or variable flight path angle over the spatial extent of the stabilization flight path section FB-1 to be determined. This flight path is defined in such a way that it transforms into the nominal final approach flight path section FB-E. The nominal final approach flight path section FB-E is the nominal flight path section that leads to the landing reference point. In this case, the inclination may be made available by an aircraft system such as, e.g., the FMS or a mission system that is functionally assigned thereto and features a mission or flight path planning device of the function for respectively determining the stabilization flight path section FB-1 or the nominal flight path. It would alternatively or additionally be possible that the nominal final approach flight path section FB-E or the constant flight path angle or a flight path angle gradient with a flight path angle that is variable over the nominal flight path is specified by the airport such as, e.g., by air traffic controllers or a nominal flight path data input and transmission unit such that the constant flight path angle or a flight path angle gradient is input manually or via an interface such as a receiver that is connected to a ground station and into which the function for determining the stabilization flight path section FB-1 is input. Flight path segments that have steeper or shallower flight path angles or may comprise a horizontal flight segment may also be inserted when the stabilization flight path section FB-1 or the nominal flight path is provided or determined. The invention is not limited to the type and the number of such segments and angle specifications used.

The stabilization flight path section FB-1 to be determined extends between the actual position of the aircraft F or a first nominal position of the aircraft F that has not yet been reached and is a planned position to be reached by the aircraft that is defined as the starting point of the stabilization flight path section FB-1 to be determined. According to the invention, it would be possible that the first nominal position is specified prior to the determination of the stabilization flight path section FB-1 or that the first nominal position results from the determined stabilization flight path section FB-1 as its starting point. In the latter instance, it would be possible that the first nominal position results from the intersecting point between the determined stabilization flight path section FB-1 and the horizontal contour line extending through the actual position. The stabilization flight path section FB-1 is defined, in particular, by at least one configuration change measure with a change of the overall profile configuration of the airfoils and at least one altitude profile that features a predetermined increase of the descending inclination of the stabilization flight path section FB-1 that corresponds to each configuration change measure at the location of the configuration change measure and optionally also at first nominal positions of the aircraft. In this context, the term "descending inclination of the stabilization flight path section FB-1" refers to the course of the stabilization flight path section FB-1 descending from the actual position of the aircraft to the landing strip, i.e., having a negative incline at every location. According to the invention, the stabilization flight path section FB-1 is realized or defined in such a way that the speed profile thereof features a predetermined speed increase or changed speed decrease that corresponds to the respective configuration change measure at every location, at which a configuration change measure is carried out.

The determination of the speed profile for the respective stabilization flight path section FB-1 to be determined takes place based on a first stabilization flight path section FB-1 that is provided as initial nominal flight path section and features, in particular, at least one configuration change measure provided in accordance with the invention, by means of which a configuration change measure and, e.g., the extension of the high-lift body of the airfoil is carried out at the location of the stabilization flight path section FB-1. In the described example, a change of the drag-lift ratio of the airfoil and therefore a deceleration of the aircraft and a change of the speed profile of the nominal flight paths section is caused at this location if a high-lift body of the airfoil is extended. In this way, the deceleration behavior of the aircraft can be influenced during the determination of the speed profile of the respective stabilization flight path section FB-1 to be determined by incorporating and positioning at least one configuration change measure. This deceleration behavior and, in particular, the effect on the speed profile occurring after changing the at least one configuration change measure is calculated with a suitable mathematical method in the module for determining a stabilization flight path section FB-1 and the position and type of the at least one configuration change measure is changed in other calculation steps, e.g., iteratively and in accordance with at least one predefined optimization criterion based on the respectively calculated effect or the respectively calculated speed profile, namely in such a way that a corresponding speed profile is obtained and the aircraft is decelerated, in particular, in the respectively determined stabilization flight path section FB-1 until the optimization goal is attained, particularly within predefined limits.

According to an embodiment of the function for automatically planning a landing approach ("managed" operating mode), the following steps, in particular, are proposed:

providing or specifying at least one configuration change measure and at least one configuration change condition that can be fulfilled while flying along the stabilization flight path section FB-1 with the aircraft F as planned, wherein a configuration change measure is assigned to each configuration change condition and causes a drag-lift ratio of the airfoils to be adjusted due to a changed adjustment of the overall aerodynamic profile configuration of airfoils of the aircraft, determining an expected final approach flight status of the aircraft F that the aircraft assumes when the predetermined stabilization region 610 or stabilization point S. S' is reached while flying along the stabilization flight path section FB-1, if the determined final approach flight status of the aircraft F only deviates from the required final approach flight status of the aircraft F within a predefined limit, assigning to the flight plan of the aircraft F the predetermined stabilization flight path section FB-1 with the configuration change condition and the least one configuration change measure that is respectively carried out on the aircraft when the at least one configuration change condition is fulfilled while flying along the stabilization flight path section FB-1 with the aircraft F as planned, if the determined final approach flight status of the aircraft F deviates from the required final approach flight status of the aircraft F by more than a predefined limit, changing the speed profile for a flight along the stabilization flight path section FB-1 by changing the at least one configuration change condition and/or the at least one configuration change measure for the fulfillment of the respective configuration change condition that is/are assigned to the provided stabilization flight path section FB-1 and/or adding at least one additional configuration change condition with a configuration change measure for the fulfillment thereof in such a way that the aircraft reaches the required final approach flight status within the predefined limit in the stabilization region 610 or at the stabilization point S, S', as well as assigning to the flight plan the thusly determined stabilization flight path section FB-1 with the at least one determined configuration change condition and the at least one configuration change measure.

According to another embodiment of the function for automatically planning a landing approach ("managed" operating mode), the function for determining the stabilization flight path section FB-1 in order to carry out the function for automatically planning a landing approach may be realized in such a way that the determination of the stabilization flight path section FB-1 between the actual position of the aircraft F or the first nominal position of the aircraft F and the stabilization region 610 and/or the stabilization point S, S' is carried out by specifying the position of the least one configuration change measure along the stabilization flight path section FB-1 to be determined, e.g., by means of corresponding variation and iterative calculation, such that the stabilization flight path section FB-1 results in the form of a connecting line between the first nominal position and the stabilization point S or safety stabilization point S' within at least a predetermined accuracy. In this case, the predetermined accuracy may be defined, in particular, in such a way that the stabilization flight path section FB-1 ends within a maximum distance around the predetermined stabilization point S or safety stabilization point S' or at the predetermined stabilization point S or safety stabilization point S'. The course of the stabilization flight path section FB-1 resulting from the respective intermediate step or iteration step is changed by respectively changing the position of the at least one configuration change measure. In this embodiment, a suitable mathematical method is chosen in order to proceed in such a way that the position of the at least one configuration change measure is strategically changed and a stabilization flight path section FB-1 results in the form of a connecting line between the first nominal position and the stabilization point S or stabilization region 610 within at least a predetermined accuracy.

According to another embodiment of the function for automatically planning a landing approach, this function may be realized in such a way that the speed profile of the stabilization flight path section FB-1 between the actual position of the aircraft F or the first nominal position of the aircraft F and the stabilization region 610 and/or the stabilization point S, S' is determined based on an optimization condition. In this case, the optimization condition may be defined in such a way that the aircraft consumes the smallest amount of fuel possible during its flight in the mode for automatically planning a landing approach, in particular, while flying through the stabilization flight path section FB-1, i.e., between the first nominal position and the stabilization region 610 and/or the stabilization point S, S'.

In this case, the optimization condition may also be defined in such a way that the shortest flight time possible elapses during the flight of the aircraft through the stabilization flight path section FB-1, i.e., between the first nominal position and the stabilization region 610 and/or the stabilization point S, S'.

During the predetermined configuration change measure, an increase of the airfoil configuration, particularly the extension into the respectively next position or the adjustment of a high-lift body relative to the main wing, preferably is carried out during each configuration change measure referred to the actual position of the aircraft.

During the determination of the speed profile of the stabilization flight path section FB-1, it would furthermore be possible that the speed profile and the respective design-related permissible speed range of the respective aircraft are taken into consideration for each airfoil configuration. In this case, it would be possible, in particular, that a configuration change measure is only carried out in the stabilization flight path section FB-1 in dependence on a speed profile if the assumed speed of the aircraft F lies below a predefined speed for a configuration of the airfoils that was adjusted prior to carrying out the respective configuration change measure. In the inventive method, a configuration change measure may be carried out if the aircraft F has a speed that does not exceed the respective lower limiting speed of the respectively applicable speed band by a predefined safety factor such as, e.g., 0.15 prior to carrying out the respective configuration change measure. The respective configuration change measure therefore should be specified at the lowest possible configuration change speeds within the speed band, in which the flight speed lies in the normal operating speed range that is assigned to a first airfoil configuration adjusted in a respective aircraft position, i.e., particularly the main wing-lifting body configuration, and corresponds to the aerodynamic design of the respective aircraft, as well as in the normal operating speed range that is assigned to the respectively adjacent configuration and corresponds to the aerodynamic design of the respective aircraft.

It would furthermore be possible to define an additional optimization condition in that a configuration change measure to be determined with an embodiment of the inventive method is respectively carried out in a step of the method in a predefined region of the stabilization flight path section FB-1 to be determined, particularly within a horizontally determined minimum or maximum distance or distance range between the position of the aircraft F, in which the respective configuration change measure should be carried out, and the stabilization region 610 and/or the stabilization point S, S' or the landing reference point that may comprise, for example, the touchdown point TD of the aircraft on the runway RW. Such a step may be provided supplementary to other optimization options.

Figure 11:
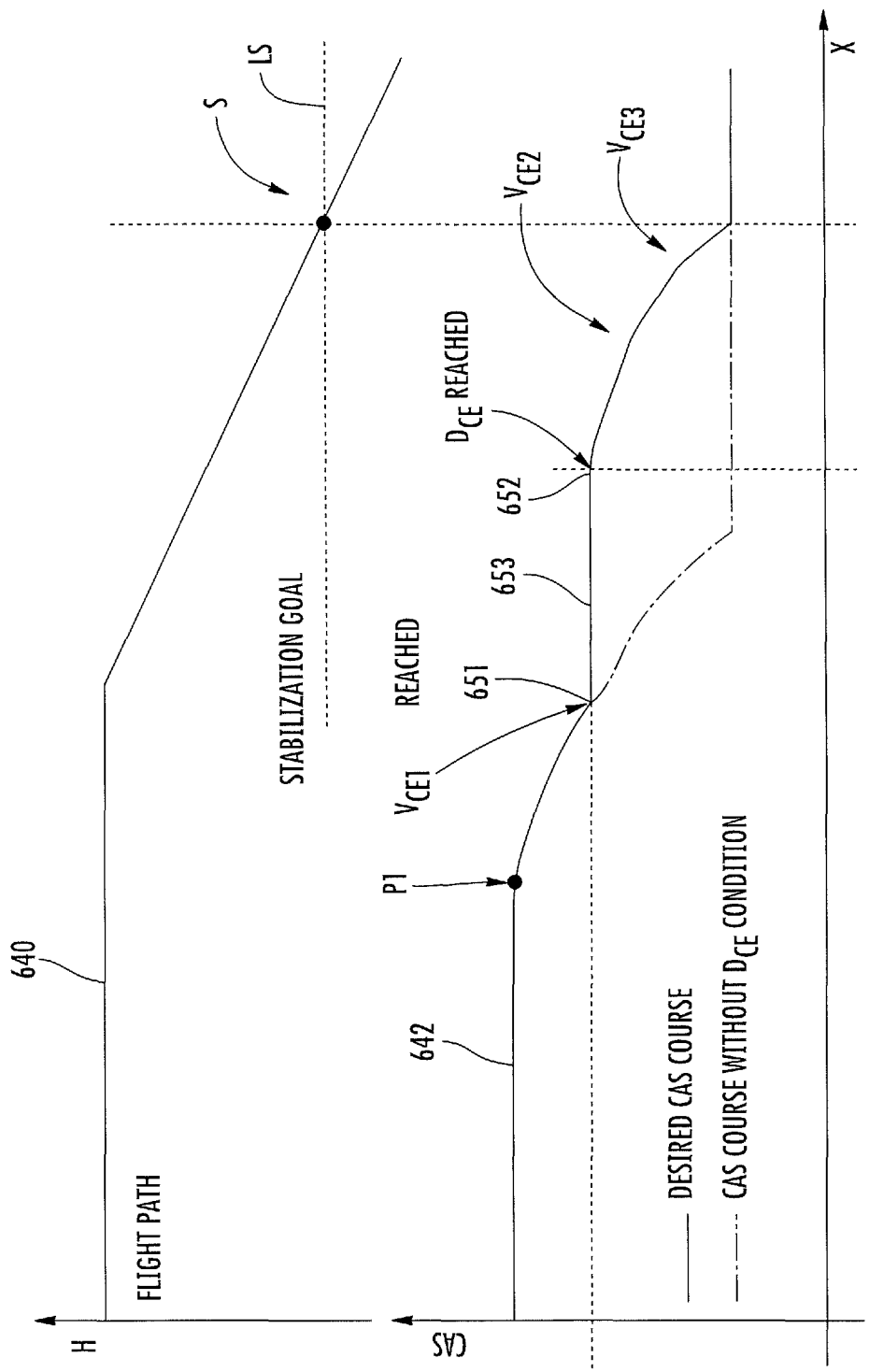
FIG. 11 shows a stabilization flight path section and a speed profile of the landing approach of an aircraft with inscribed configuration change speeds.

FIG. 11 shows an altitude profile 640 of a stabilization flight path section FB-1 and a speed profile 642 for the landing approach of an aircraft F that results due to such an adjustment of the configuration change speeds. The configuration change flight status for adjusting the at least one leading edge lifting body 13a, 13b and/or trailing edge lifting body 14a, 14b from the cruising flight position into a first extended position of the respective lifting body is already reached at the point 651 of the speed profile 642 because the speed of the aircraft corresponds to the VCE at this point 651. However, the extension of the leading edge lifting bodies 13a, 13 and/or trailing edge lifting bodies 14a, 14b into the first extended position is only carried out after traveling an additional distance 653. In the example shown, the extension of the leading edge lifting body 13a, 13b and/or the trailing edge lifting body 14a, 14b into the first extended position does not already take place when the airspeed $VCE_1$ is reached, but rather subsequently at the point 652 once a predetermined horizontal distance $D_{CE1}$ is reached. The speed of the aircraft is further reduced at this point. As soon as the next speed band of lower airspeed is reached, the at least one leading edge lifting body 13a, 13b and/or trailing edge lifting body 14a, 14b is moved into the second extended position once the airspeed $VCE_2$ is reached, wherein the at least one leading edge lifting body 13a, 13b and/or trailing edge lifting body 14a, 14b is moved into the third extended position once the airspeed $VCE_3$ is reached as soon as the airspeed shifts to the next lower speed band.

According to an embodiment, these configuration change speeds and the speed profile of the stabilization flight path section FB-1 are determined by means of an analytical calculation rather than an optimization algorithm.

An alternative method for determining the configuration change speeds and the speed profile of the stabilization flight path section FB-1 that may be realized in the function for automatically planning a landing approach is based on a predefined initial stabilization flight path section FB-0. In a simulation step, it is determined at which point along the stabilization flight path section FB-0 the landing speed is reached. If this takes place behind the stabilization point S referred to the direction of flight, the value for the distance $D_{CE1}$, at which the at least one leading edge lifting body 13a, 13b and/or trailing edge lifting body 14a, 14b is moved into the first extended position, and/or the values for the configuration change speeds $VCE_1$, $VCE_2$ and/or $VCE_3$ is/are changed and shifted opposite to the flight direction in the described example (opposite to the X-axis in FIG. 11). This step is iteratively repeated until the landing speed is assumed before the stabilization point S referred to the direction of flight or in a stabilization region 610.

A speed profile of the stabilization flight path section FB-1, by means of which a predefined optimization goal is attained, therefore is reached with this function or with this embodiment of the function for automatically planning a landing approach. In an embodiment of the function for automatically planning a landing approach, the inventive function or the inventive method for determining a speed profile of the stabilization flight path section FB-1 may be realized in such a way that it can be respectively activated, in particular, manually or by a trigger signal from another aircraft system such as the FMS. According to the invention, it would for this purpose be possible, in particular, that the activation is realized by selecting the special form of the function for automatically planning a landing approach, e.g., by means of an input on a corresponding input device of the men-machine interface, particularly a display in the cockpit. It would be possible, in particular, to provide an interactive display for this purpose. For the input, it is possible to select, e.g., "short approach" or "low fuel consumption" in accordance with the optimization goal.

Consequently, flight statuses are changed by means of the method in such a way that the predefined optimization goal such as, e.g., "short approach" or "low fuel consumption" is attained and the aircraft flies through the stabilization flight path section FB-1 with the lowest possible speed or with the lowest possible fuel consumption per distance traveled. Another optimization goal may comprise reaching the runway or the reference point in a fixed time window or at a certain time.

Figure 12:
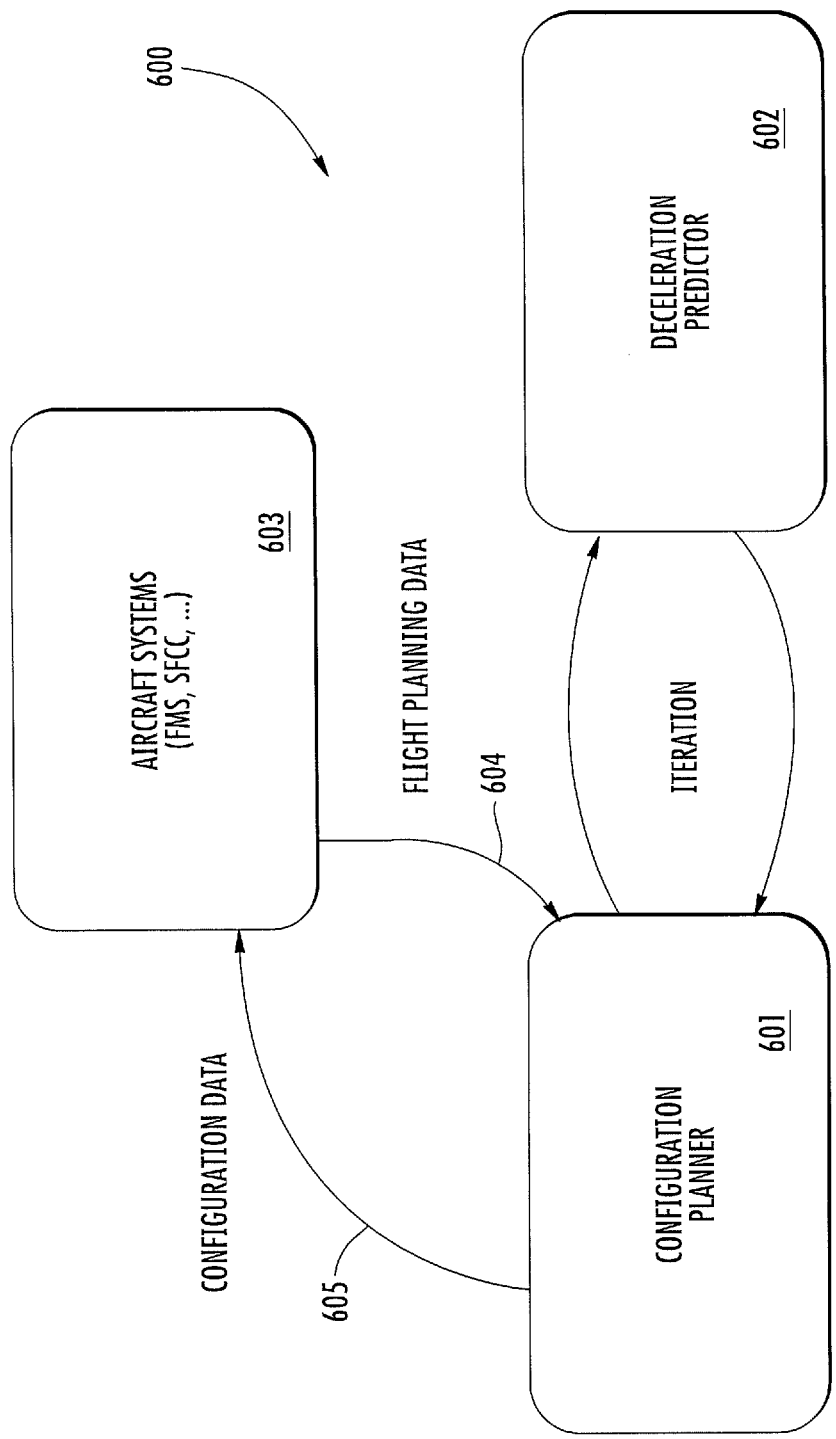
FIG. 12 shows an embodiment of an optimization function of an inventive function for automatically planning a landing approach, wherein said optimization function features sub-functions in the form of a configuration planner and a deceleration predictor.

FIG. 12 shows an embodiment of this optimization function 600 of the function for automatically planning a landing approach that features subfunctions in the form of a configuration planner 601 that specifies the configuration change flight statuses and, in particular, the configuration times and/or the configuration positions, as well as a deceleration predictor 602 that determines expected decelerations along the planned flight path based on the configuration change flight statuses. The configuration planner 601 receives flight planning data 604 from an aircraft system 603 that may comprise, in particular, the flight management system FMS. The configuration planner 601 determines configuration change flight statuses that are transmitted to the deceleration predictor 602 based on this flight planning data 604. This deceleration predictor determines in each iteration step the point along the stabilization flight path section FB-1, at which the landing status of the aircraft and, in particular, the landing speed of the aircraft, is reached. The deceleration predictor 602 feeds the result, i.e., this point along the nominal flight path, back to the configuration planner 601 that changes the configuration change flight statuses and therefore also the configuration changes of the airfoil. In the example according to FIG. 11, this may comprise, e.g., shifting the distance $D_{CE1}$ rearward in the assumed direction of flight. The change depends on the respectively pursued optimization goal for the optimization or adaptation function. The deceleration predictor 602 in turn carries out calculations with respect to the effects for adjusting the landing status or the landing speed in a respective iteration step of the configuration planner 61. These iterations are repeated until the nominal flight path is optimized in such a way that the predictor predicts that the landing status is reached before the stabilization point S or in the stabilization region 610. According to the inventive method, the course of the flight path therefore is changed provided that a change of the course of the first stabilization flight path section FB-1 is calculated by adapting the configuration change flight statuses with respect to the attainment of an optimization goal while maintaining the target specification.

Figure 13:
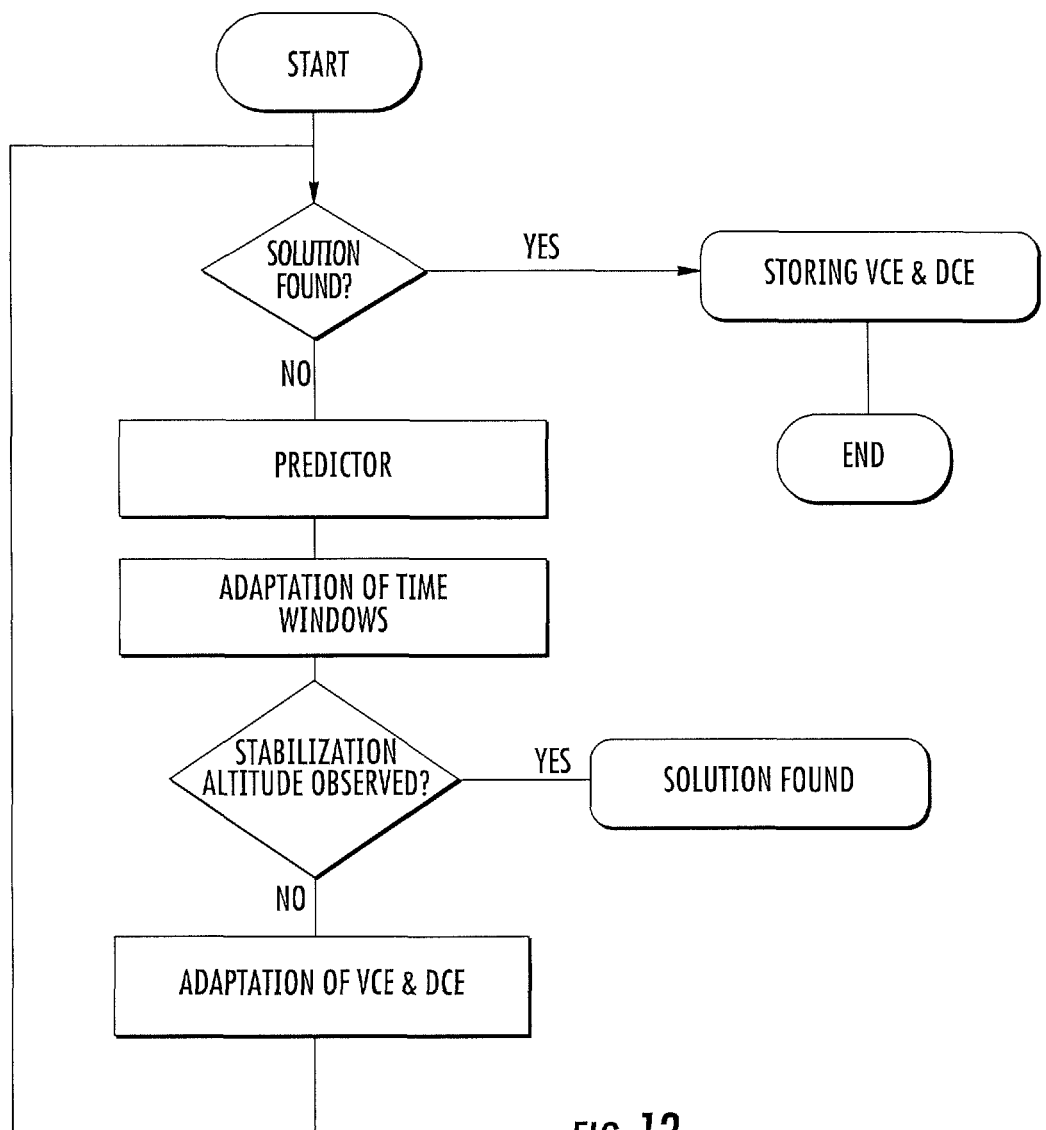
FIG. 13 shows a flow chart of the optimization function illustrated in FIG. 12, and FIGS. 14 to 16 show different steps of an inventive method, in which a nominal flight path is adapted for the landing.

FIG. 13 shows an embodiment of the configuration planner 601 in the form of a program flow chart. The predictor 602 is invoked in a loop-beginning after the start. If necessary, the stabilization region 610 or the stabilization window 616 can be adapted in dependence on the result. It is subsequently checked whether the prescribed stabilization altitude is observed, i.e., whether stabilization was reached at the stabilization point S and/or within the stabilization region 610 and/or the stabilization window 616. If this is not the case, an adaptation of $VCE_i$ and/or $DCE_i$ is carried out in order to shift the stabilization in the desired direction and the loop begins anew. If the prescribed stabilization altitude was observed and stabilization was reached at the stabilization point S and/or within the stabilization region 610 and/or the stabilization window 616, a solution is found and the thusly determined values of $VCE_i$ and $DCE_i$ are stored for further use instead of beginning the loop anew. This method may also be repeatedly invoked, wherein the values are in this case determined anew every time. The utilization of this method makes it possible to realize a perpetual optimization of $VCE_i$ and $DCE_i$ during the landing approach.

Figure 15:
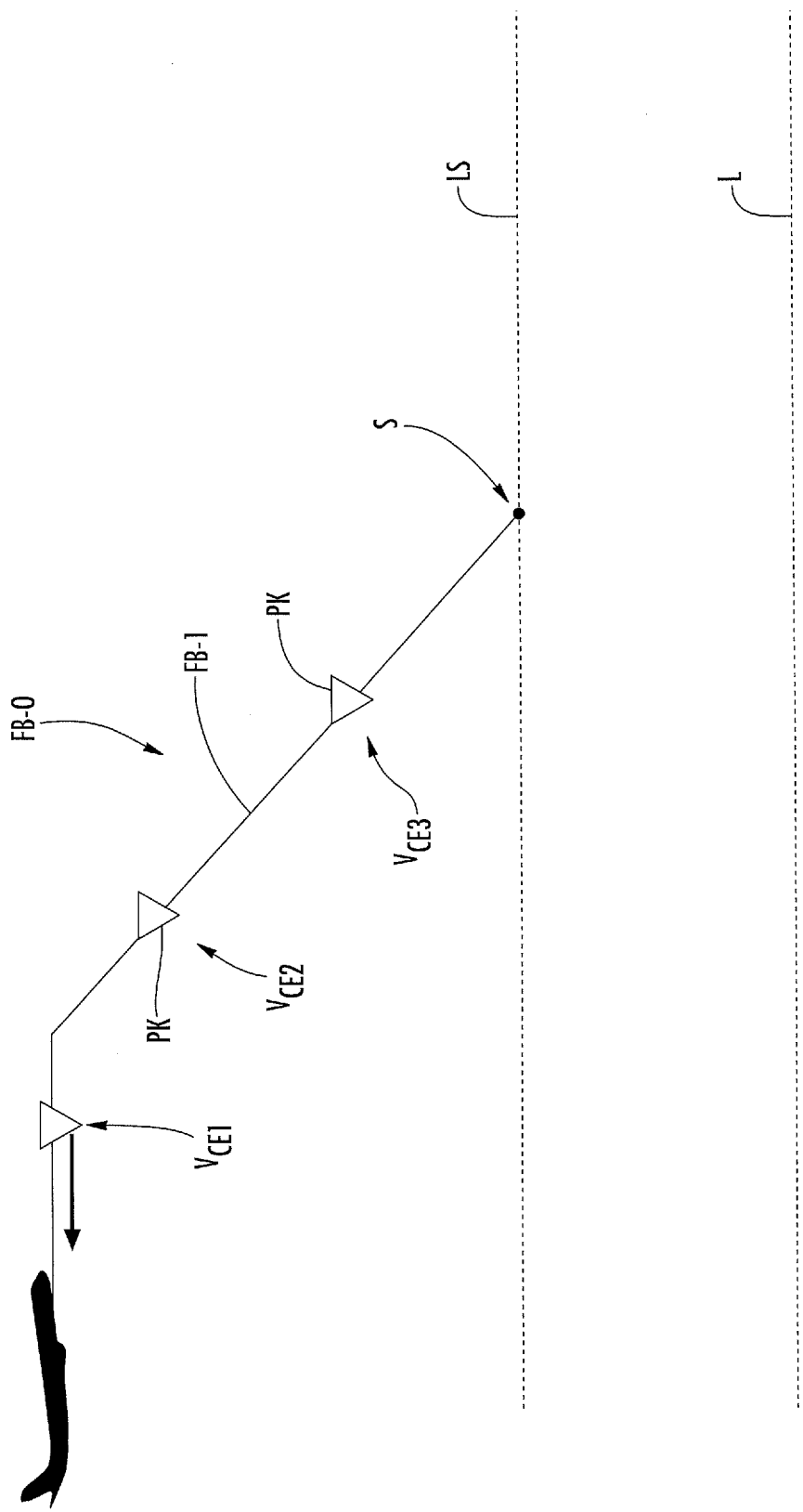

An embodiment of the function for automatically planning a landing approach ("managed landing maneuver operating mode") is described below with reference to FIGS. 14 to 16: the altitude profile of the predefined stabilization flight path section is not changed, but rather remains the same during the iterations carried out or to be carried out. However, only the configuration change conditions and, in particular, the configuration change flight statuses, in which the airfoil configurations should change and which should be reached incrementally along the flight path, are changed with respect to their position along the nominal flight path. The initial nominal flight path FB-0 is provided with points, at which configuration change speeds VCE occur and the configuration changes of the airfoils therefore are carried out. The position of each configuration change speed VCE; (e.g., the speeds $VCE_1$, $VCE_2$, $VCE_3$), at which the configuration change of the airfoils should be carried out, such that a corresponding distance $HCE_1$, $HCE_2$, $HCE_3$ respectively results. The first calculation is illustrated in an exemplary fashion in FIG. 14: the landing speed is reached at a point LV that lies behind the stabilization point S referred to the direction of flight. According to FIG. 15, the iteration measure is realized in the presently described function by shifting the configuration change speed $VCE_1$ closer to the actual position of the aircraft opposite to the assumed direction of flight. This is carried out until the state illustrated in FIG. 16 is achieved, in which the landing speed LV is reached at a point that lies at the stabilization point S or in a stabilization region 610 referred to the direction of flight.

According to an embodiment of the method, it is also possible to input wind data, particularly wind speeds and wind directions, by means of a data link and/or pilot input. This may take place manually or automatically. The wind data is then used for predicting the actual deceleration of the aircraft referred to the ground more accurately during the prediction of the stabilization in the deceleration predictor 602 of the embodiment of the landing approach planner illustrated in FIG. 12.

The optimization goal can be selected from a plurality of goals or be composed of a number of optimization sub-goals and contain boundary conditions to be fulfilled in both instances. An optimization goal may comprise, in particular, the fastest approach possible. Another optimization goal may comprise observing the predefined flight time as precisely as possible. Another optimization goal may comprise the aircraft consuming as little fuel as possible during its landing approach. Another optimization goal may comprise the aircraft requiring the least possible thrust during the landing approach or the maximum occurring thrust remaining as low as possible during the landing approach.

The invention claimed is:

1. A method for planning a landing approach of an aircraft based on an actual position or a first nominal position of the aircraft during its approach for landing on a runway, the method comprising:

providing a stabilization region and/or a stabilization point with respect to the landing of the aircraft, a final approach flight status of the aircraft required for the stabilization region and/or the stabilization point and a stabilization flight path section that is at least defined in a form of an altitude profile and extends between the actual position or the first nominal position of the aircraft and the stabilization region and/or the stabilization point;

providing or specifying at least one configuration change condition that can be fulfilled while flying along the stabilization flight path section with the aircraft as planned and at least one respective configuration change measure that is assigned to the at least one configuration change condition and causes a drag-lift ratio of airfoils to be adjusted due to a changed adjustment of an overall aerodynamic profile configuration of the airfoils of the aircraft; and assigning to a flight plan of the aircraft a combination of the predetermined stabilization flight path section and the at least one configuration change condition with the least one configuration change measure that is respectively assigned to this configuration change condition and carried out on the aircraft when the respective configuration change condition is fulfilled while flying along the stabilization flight path section with the aircraft as planned, wherein assigning to the flight plan of the aircraft comprises:

determining an expected final approach flight status of the aircraft, which the aircraft assumes when the predetermined stabilization region or the stabilization point is reached while flying along the stabilization flight path section, wherein, if the expected final approach flight status of the aircraft only deviates from the required final approach flight status of the aircraft within predefined limits, assigning to the flight plan of the aircraft the combination of the predetermined stabilization flight path section and the at least one configuration change condition with the least one configuration change measure that is respectively assigned to this configuration change condition and carried out on the aircraft when the respective configuration change condition is fulfilled while flying along the stabilization flight path section with the aircraft as planned, and wherein, if the expected final approach flight status of the aircraft deviates from the required final approach flight status of the aircraft by more than the predefined limits, changing a speed profile for a flight along the stabilization flight path section by changing the at least one configuration change condition and/or the at least one configuration change measure for fulfillment of the respective at least one configuration change condition that is/are assigned to the provided stabilization flight path section, and/or by adding at least one additional configuration change condition with a configuration change measure for fulfillment thereof in such a way that the aircraft reaches the required final approach flight status of the aircraft within the predefined limit in the stabilization region or at the stabilization point, as well as assigning to the flight plan of the aircraft the combination of the determined stabilization flight path section and the at least one determined configuration change condition with the least one configuration change measure that is respectively assigned to this configuration change condition.

2. The method according to claim 1, wherein the configuration change condition for the flight of the aircraft along the stabilization flight path section comprises: reaching a configuration change point along the respectively provided stabilization flight path section, and/or reaching at least one configuration change flight status while flying along the stabilization flight path section as planned, and/or reaching at least one configuration change time while flying along the stabilization flight path section as planned.

3. The method according to claim 2, further comprising:
determining the stabilization flight path section by defining a flight path section backward from the stabilization point or the stabilization region in a direction of a current actual position of the aircraft during the at least one predetermined configuration change measure along the flight path section such that a starting point of the stabilization flight path section and a course of the stabilization flight path section, which is at least defined by a positionally fixed starting point and an altitude profile, result; and
carrying out a subsequent flight along the determined stabilization flight path section with an automatic flight path control or a display of control commands for carrying out a subsequent manual flight along the flight path to a pilot on a flight instrument;
wherein the at least one configuration change measure of the airfoils is carried out automatically or by the pilot when the aircraft passes the configuration change point, and/or when the configuration change flight status is reached and/or when the configuration change time is reached.

4. The method according to claim 1, wherein the final approach flight status is defined by a speed of the aircraft.

5. The method according to claim 4, wherein the final approach flight status comprises at least a presence of at least one of the following data:
an adjusting state of the airfoils and an adjusting state of at least one aerodynamic high-lift aid on a main wing of the airfoils, in which the at least one aerodynamic high-lift aid is in a predefined landing position, and/or
a state of landing gear, in which the landing gear is lowered, and/or
a state, in which certain deviations from predefined variables and a deviation of the aircraft from a landing course and a gliding path are not exceeded, and/or
adjustment of a certain engine speed that is higher than in an idling state of an engine.

6. The method according to claim 1, wherein a change of the at least one configuration change condition and/or the adjustment of the overall aerodynamic profile configuration of the airfoils of the aircraft is realized by carrying out the predetermined configuration change measure and/or adding the at least one additional configuration change measure with the adjustment of the overall aerodynamic profile configuration of the airfoils in the stabilization flight path section based on one or more optimization goals, the one or more optimization goals comprising:
the aircraft requires a shortest possible flight time during the flight with an optimized execution of the landing approach between the first nominal position and the stabilization region and/or the stabilization point,
the aircraft observes a suitable predetermined flight time within the predefined limits during the flight with the optimized execution of the landing approach between the first nominal position and the stabilization region and/or the stabilization point,
engines of the aircraft together generate a lowest possible thrust or a lowest possible maximally occurring thrust during the flight with the optimized execution of the landing approach between the first nominal position and the stabilization region and/or the stabilization point, and/or
the aircraft consumes a smallest possible quantity of fuel during the flight with the optimized execution of the landing approach between the first nominal position and the stabilization region and/or the stabilization point.

7. The method according to claim 1, wherein the at least one configuration change measure comprises at least one of:
at least one respective predetermined change of the configuration of the airfoils for changing the deformation state of a main wing of the aircraft, and/or
an adjusting angle of at least one leading edge high-lift aid and, in particular, relative to the main wing, and/or
an adjusting angle of at least one trailing edge high-lift aid and, in particular, relative to the main wing, and/or
a deformation state of the at least one leading edge high-lift aid, and/or
a deformation state of the at least one trailing edge high-lift aid.

8. The method according to claim 1, further comprising determining a nominal flight path until reaching a residual flight altitude prior to the landing of the aircraft based on the stabilization flight path section and a final approach nominal flight path section that is predefined with respect to its altitude profile is used as a specification for determining the nominal flight path;
wherein the stabilization flight path section transforms into the final approach nominal flight path section;
wherein the final approach nominal flight path section extends between the stabilization region and/or the stabilization point and a landing reference point that is related to position data of the runway and lies between the stabilization region and/or the stabilization point and the runway; and
wherein the stabilization flight path section and the predetermined final approach nominal flight path section are respectively defined by a location-dependent or time-dependent altitude profile, wherein the aircraft carries out a descent to a residual flight altitude with a constant flight path angle and/or with a constant speed along the final approach nominal flight path section.

9. The method according to claim 8, wherein the landing reference point is with respect to the runway a planned touchdown point of the aircraft on the runway.

10. The method according to claim 1, wherein the stabilization point or a safety stabilization point is defined in the stabilization region in such a way that it lies at a beginning of a predetermined final approach nominal flight path section that is defined by an altitude profile and a speed profile.

11. The method according to claim 1, wherein a nominal and/or actual flight status of the aircraft is used as a starting point of the stabilization flight path section in the determination of the stabilization flight path section, and wherein the determination of the stabilization flight path section is carried out by varying the at least one configuration change measure and/or control specifications for controlling an aircraft speed that is variable over the stabilization flight path section or a thrust that is variable over the stabilization flight path section for a predetermined flight path course in a horizontal plane.

12. A computer program product that causes the method according to claim 1 to be carried out on a program-controlled device.

13. A computer program product with a landing approach plan prepared by the method according to claim 1 stored thereon.

14. A device for planning a landing approach of an aircraft with a function for flight path control of the aircraft based on an actual position or a first nominal position of the aircraft during the approach for landing on a runway, the device comprising:
- an interface for receiving a stabilization flight path section between the actual position or the first nominal position of the aircraft and a stabilization region and/or a stabilization point that is defined in a form of an altitude profile by at least one configuration change point for at least one provided configuration change measure in the stabilization flight path section with a change of an overall profile configuration of airfoils at the at least one configuration change point and with a predetermined final approach flight status of the aircraft for the stabilization region or the stabilization point; and
- a function module for checking or changing a position at which the at least one configuration change measure is carried out in the stabilization flight path section, by a change within the stabilization flight path section and/or an addition of an additional configuration change measure to the stabilization flight path section and by thusly changing a speed profile along the stabilization flight path section in such a way that the aircraft reaches the predetermined final approach flight status at least within predefined limits in the stabilization region or at the stabilization point;
- wherein the device is configured to determine an expected final approach status of the aircraft, which the aircraft assumes when the predetermined stabilization region or the stabilization point is reached while flying along the stabilization flight path section, such that if the expected final approach flight status of the aircraft only deviates from a required final approach flight status of the aircraft within the predefined limits, assigning to the flight plan of the aircraft the combination of the predetermined stabilization flight path section and the at least one configuration change condition with the least one configuration change measure that is respectively assigned to this configuration change condition and carried out on the aircraft when the respective configuration change condition is fulfilled while flying along the stabilization flight path section with the aircraft as planned; and
- if the expected final approach flight status of the aircraft deviates from the required final approach flight status of the aircraft by more than the predefined limits, changing a speed profile for a flight along the stabilization flight path section by changing the at least one configuration change condition and/or the at least one configuration change measure for fulfillment of the respective at least one configuration change condition that is/are assigned to the provided stabilization flight path section, and/or by adding at least one additional configuration change condition with a configuration change measure for fulfillment thereof in such a way that the aircraft reaches the required final approach flight status of the aircraft within the predefined limit in the stabilization region or at the stabilization point, as well as assigning to the flight plan of the aircraft the combination of the determined stabilization flight path section and the at least one determined configuration change condition with the least one configuration change measure that is respectively assigned to this configuration change condition.

* * * * *